May 11, 1937. H. G. ALLEN 2,079,673
STAPLING OR WIRE STITCHING MACHINE
Filed May 31, 1935 11 Sheets-Sheet 1

Inventor:
Howard G. Allen
By
Attorneys.

May 11, 1937. H. G. ALLEN 2,079,673
STAPLING OR WIRE STITCHING MACHINE
Filed May 31, 1935 11 Sheets-Sheet 2

Inventor:
Howard G. Allen
By
Attorneys.

May 11, 1937. H. G. ALLEN 2,079,673
STAPLING OR WIRE STITCHING MACHINE
Filed May 31, 1935 11 Sheets-Sheet 4

Inventor:
Howard G. Allen
By
Attorneys.

May 11, 1937.   H. G. ALLEN   2,079,673
STAPLING OR WIRE STITCHING MACHINE
Filed May 31, 1935   11 Sheets-Sheet 5
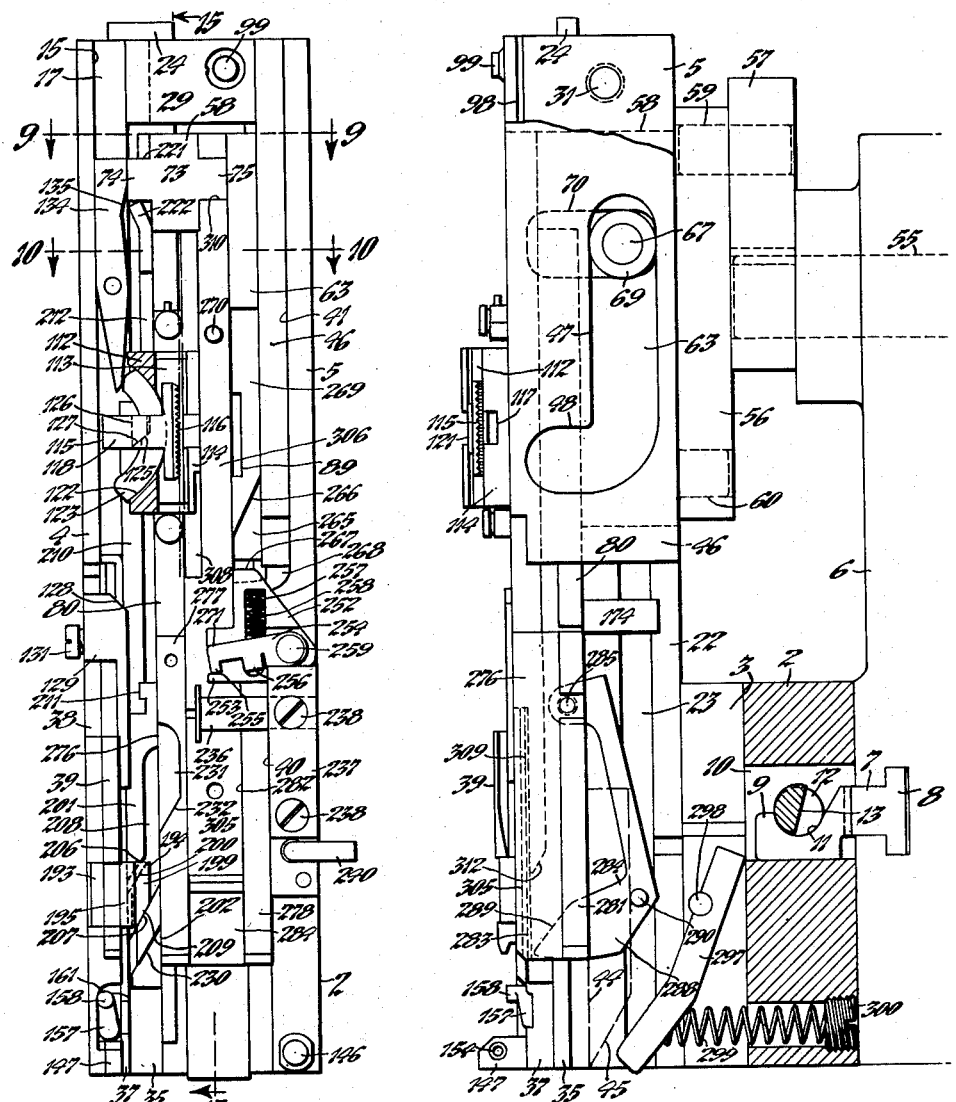
Fig. 7.   Fig. 8.
Fig. 9.   Fig. 10.
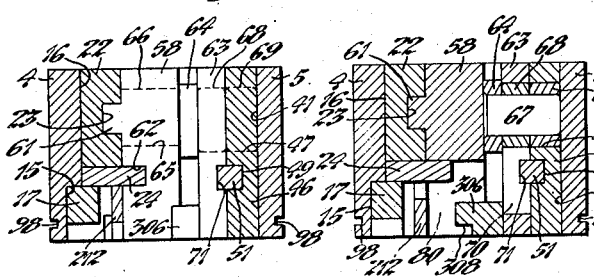
Inventor:
Howard G. Allen May 11, 1937.  H. G. ALLEN  2,079,673
STAPLING OR WIRE STITCHING MACHINE
Filed May 31, 1935   11 Sheets-Sheet 6

Inventor:
Howard G. Allen
By Pennington and White
Attorneys.

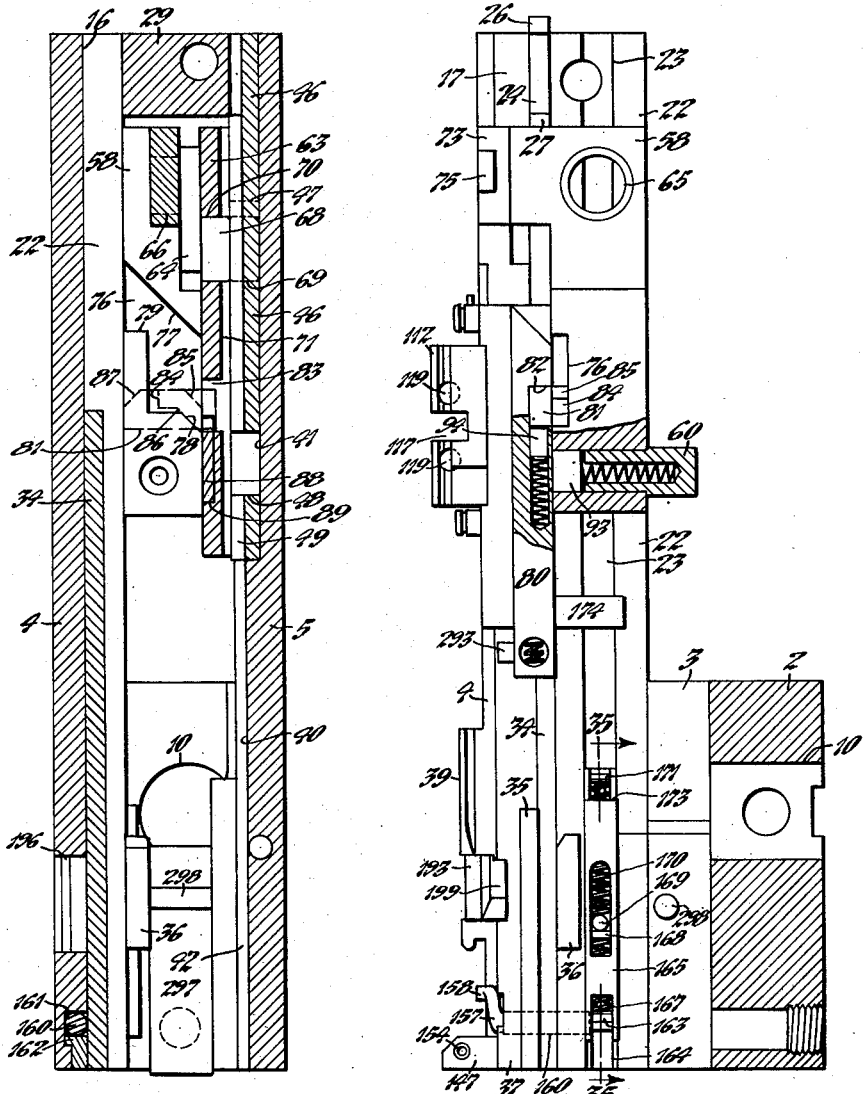

May 11, 1937.  H. G. ALLEN  2,079,673
STAPLING OR WIRE STITCHING MACHINE
Filed May 31, 1935  11 Sheets-Sheet 8

Inventor:
Howard G. Allen
By
Attorneys.

May 11, 1937. H. G. ALLEN 2,079,673
STAPLING OR WIRE STITCHING MACHINE
Filed May 31, 1935 11 Sheets-Sheet 9
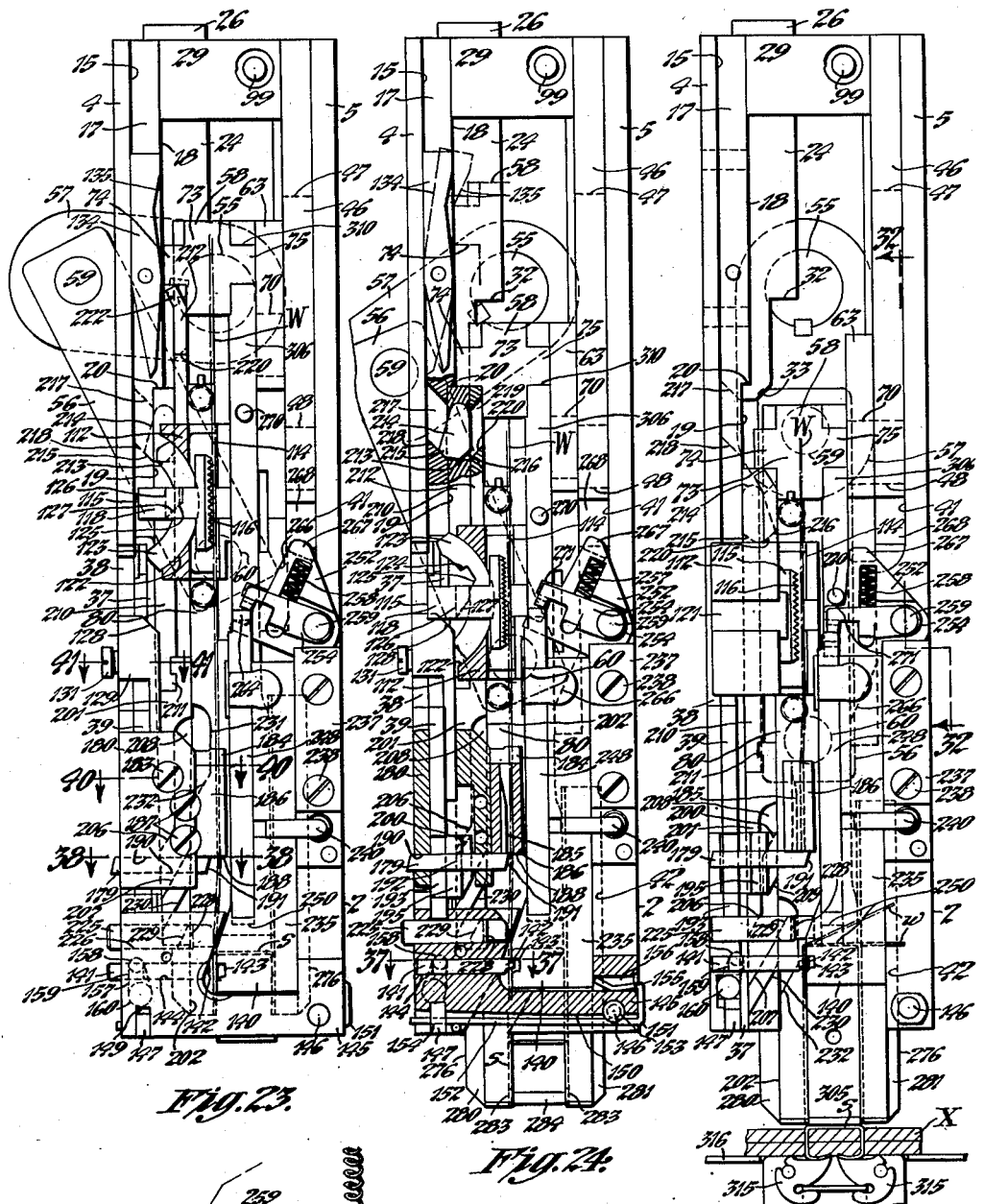
Fig. 23. Fig. 24.
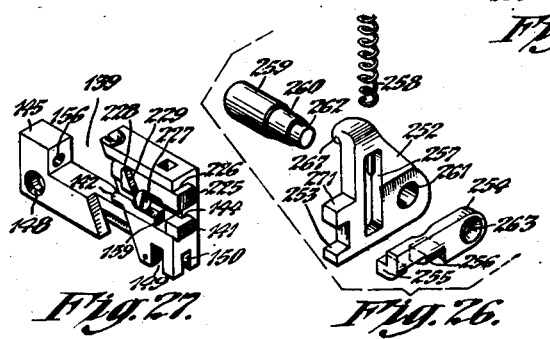
Fig. 25.
Fig. 27. Fig. 26.
Inventor:
Howard G. Allen
By
Attorneys.

May 11, 1937.  H. G. ALLEN  2,079,673
STAPLING OR WIRE STITCHING MACHINE
Filed May 31, 1935  11 Sheets-Sheet 10
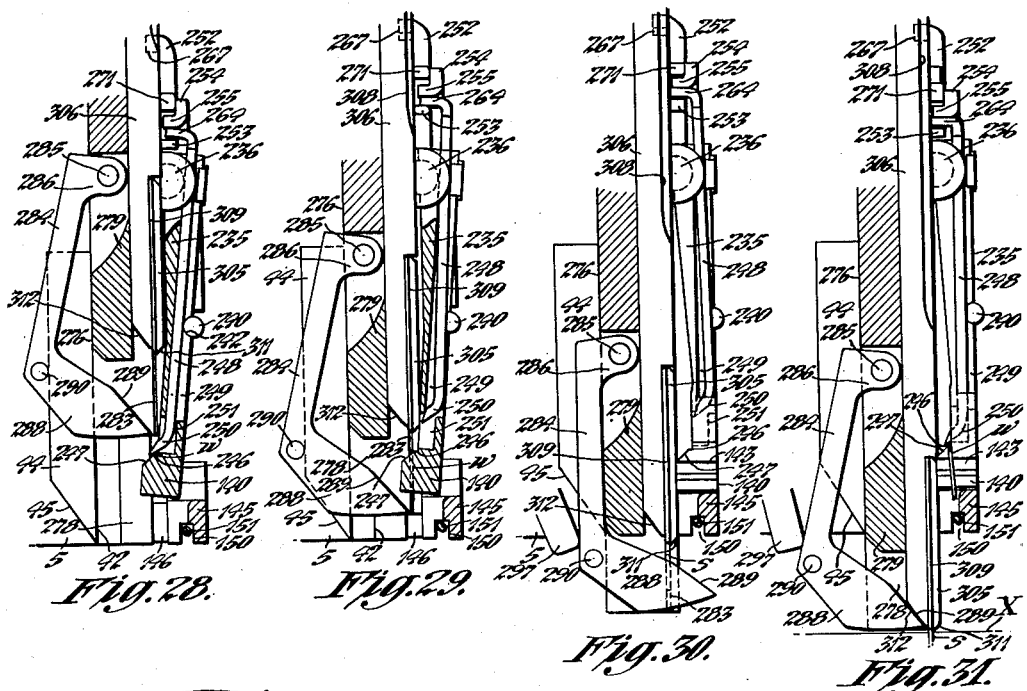
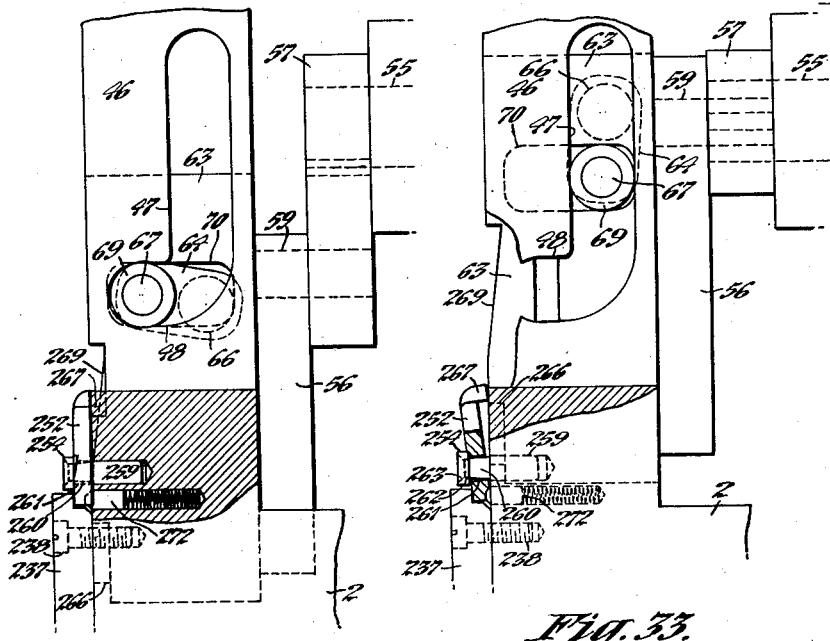
Inventor:
Howard G. Allen
By
Attorneys.

May 11, 1937. H. G. ALLEN 2,079,673
STAPLING OR WIRE STITCHING MACHINE
Filed May 31, 1935 11 Sheets-Sheet 11
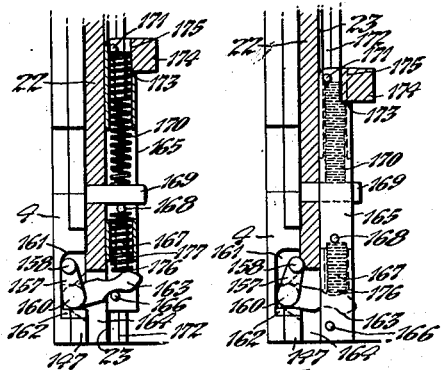
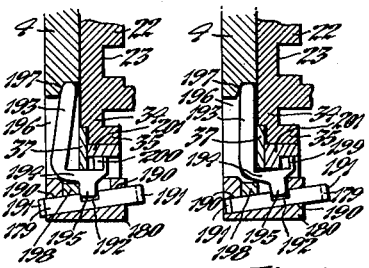
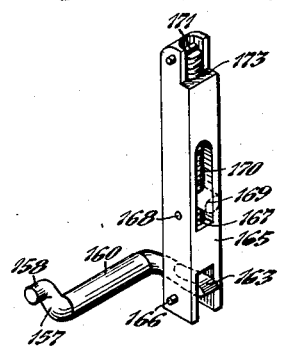
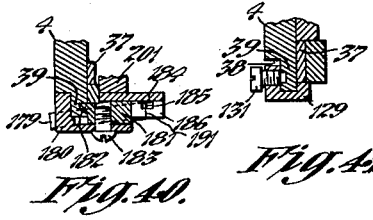
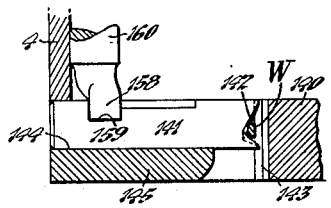
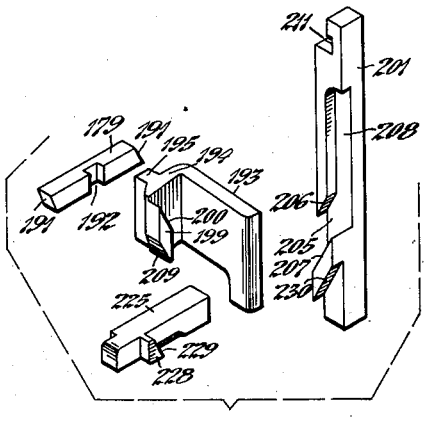
Inventor:
Howard G. Allen Patented May 11, 1937

2,079,673

UNITED STATES PATENT OFFICE 2,079,673

STAPLING OR WIRE-STITCHING MACHINE

Howard G. Allen, Edgewood, R. I., assignor to Boston Wire Stitcher Company, Portland, Maine, a corporation of Maine Application May 31, 1935, Serial No. 24,288

49 Claims. (Cl. 1—2)

The present invention relates to stapling or wire-stitching machines and more particularly to a type of machine in which wire or other strip-material is fed into a stapling head, formed into staples, and the staples driven into the work by a sequence of operations.

One object of the present invention is to provide a machine of the type indicated in which a predetermined length of wire is fed to a position adjacent one side of an anvil and then successively bent over the adjacent and opposite sides of the anvil to form a staple.

Another object of the present invention is to provide a machine of the type indicated having bender-bars acting at right-angles to each other and cooperating with an anvil to successively bend a length of wire to form a staple.

Another object of the present invention is to provide a novel mechanism for feeding predetermined lengths of a continuous strip of wire or other strip-material to be subsequently severed and formed into a staple.

Another object of the present invention is to provide a machine of the type indicated with means for holding one end of a length of wire against one side of an anvil while the extending portion of the wire is bent over the adjacent side of the anvil to partially form a staple.

Another object of the present invention is to provide a gripper-bar for cooperation with the anvil to hold the bent extension of the wire against the anvil while the anvil is moved rearwardly into cooperative relationship with a bender-bar.

Another object of the present invention is to provide a machine of the type indicated having novel means for successively actuating a cutter-bar and bender-bar for severing and bending a length of wire advanced by the feeding means.

Another object of the present invention is to provide a machine of the type indicated having a novel driving connection between the main driving element, a driving plate and an intermediate driving element to provide for relative movement of the elements in timed relationship.

Another object of the present invention is to provide a machine of the type indicated having operating mechanism for simultaneously forming a staple and driving a previously formed staple during one complete cycle of operation.

Another object of the present invention is to provide a machine of the type indicated having a novel construction and arrangement of elements for acting on a length of wire or like strip-material in timed relationship to form and drive a staple.

Further objects of the present invention are set forth in the following specification which describes a preferred embodiment of the machine, by way of example, as illustrated by the accompanying drawings. In the drawings:

Fig. 7 is a front elevational view of the head similar to Fig. 4 showing it with the front plate, anvil, cutting mechanism and laterally-movable bender-bar assembly removed and with the feeding mechanism partly in section;

Fig. 8 is a side elevational view of the assembly illustrated in Fig. 7, showing the side of the bonnet partly broken away to disclose the interior of the head;

Fig. 9 is a sectional plan view taken on line 9—9 of Fig. 7 and showing the relation of the reciprocating parts;

Fig. 10 is a sectional plan view taken on line 10—10 of Fig. 7 and showing one end of the rockable crank for drivingly connecting the main driving element with the driving plate;

Fig. 14 is a front elevational view of the head in section taken on line 14—14 of Fig. 5 and showing the cam-faces on the main driving element for actuating the sliding bolt;

Fig. 15 is a side elevational view of the head in section taken on line 15—15 of Fig. 7 and showing the relationship of the main driving element and intermediate driving element in a position corresponding to that shown in Fig. 14;

Fig. 16 is a sectional plan view of the head taken on line 16—16 of Fig. 4 and showing the spring-pressed rod for actuating the anvil to a position below the staple-driver;

Fig. 23 is a front elevationl view of the stapling head with the front cover removed and the feeding mechanism illustrated partly in section, and showing the relationship of the elements when the main driving element has completed substantially half of its forward stroke;

Fig. 24 is a view similar to Fig. 23 partly in section and showing the relationship of the elements when the main driving element has been moved through three-quarters of its forward stroke;

Fig. 25 is a view similar to Fig. 23 showing the relationship of the elements after the main driving element has reached the end of its forward stroke;

Fig. 26 is an extended composite perspective view of the elements forming the pivoted lever for actuating the gripper which holds the horizontal length of the wire against the anvil;

Fig. 27 is a detailed perspective view of the block-assembly carrying the holding and cutter-bars, illustrating it as turned one hundred and eighty degrees from its operative position to show the rear face thereof;

Fig. 28 is a side elevational view in section taken on line 28—28 of Fig. 4 and showing the relationship of the pivoted anvil, vertically acting bender-bar and staple-driver when the staple-driver is in its uppermost position;

Fig. 29 is a view similar to Fig. 28 showing the relationship of these elements just prior to the forward movement of the pivoted anvil;

Fig. 30 is a view similar to Fig. 28 showing the relationship of the elements after the anvil has been moved forwardly and the staple in the bender-bar has been engaged by the staple-driver;

Fig. 31 is a view similar to Fig. 28 showing the relationship of the elements when the staple-driver has reached the lower end of its movement;

Fig. 32 is a side elevational view in section of part of the stapling head taken on line 32—32 of Fig. 25 and showing the relation of the actuating lever for the gripper-bar and driving plate when the plate is adjacent the end of its forward stroke;

Fig. 33 is a view similar to Fig. 32 showing the relationship of these elements during the return stroke of the driving plate;

Fig. 34 is a detailed perspective view of the actuating mechanism for the laterally-movable holder-bar;

Fig. 35 is a sectional view taken on line 35—35 of Fig. 15 and showing the actuating mechanism for the holder-bar in its inoperative position;

Fig. 36 is a view similar to Fig. 35 showing the actuating mechanism in its operative position to carry the holding bar into engagement with the wire;

Fig. 37 is a plan view in section taken on line 37—37 of Fig. 24 and showing the connection between the holder-bar and its actuating mechanism;

Fig. 38 is a plan view in section of the cutter-bar and its actuator taken on line 38—38 of Fig. 23 and showing these elements in their inoperative position;

Fig. 39 is a view similar to Fig. 38 showing the relationship of the elements when actuated to an operative cutting position;

Fig. 40 is a plan view in section taken on line 40—40 of Fig. 23 and showing the manner in which the cutter-block assembly is adjustably mounted on the front wall of the bonnet-frame.

Fig. 41 is a plan view in section taken on line 41—41 of Fig. 23 and showing the manner in which the abutment for actuating the feeding mechanism is adjustably mounted; and Fig. 42 is a detailed composite perspective view of the cutter-bar and its pivoted actuator, the laterally-movable bender-bar, and actuating slide, with the slide shown as turned 90 degrees from its operative position.

Figure 1:
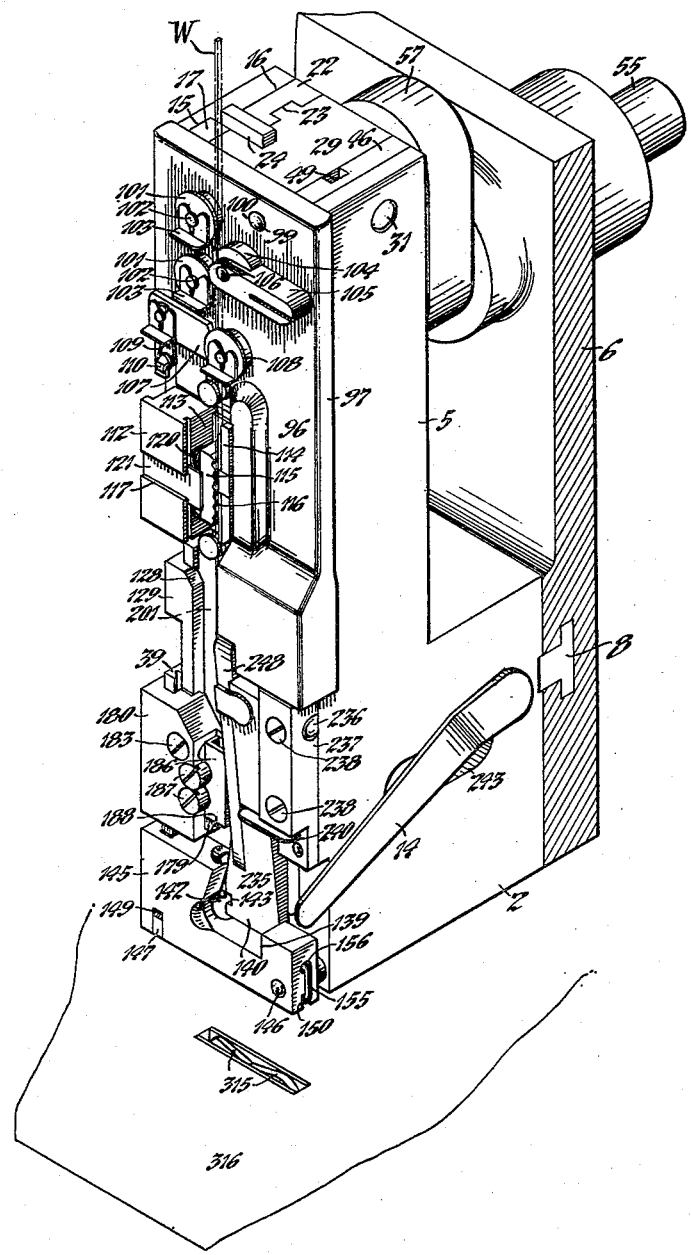
Fig. 1 is a perspective view of the stapling head incorporating the novel features of the present invention.

Heretofore, it has been proposed to provide stapling or wire-stitching machines in which a continuous strip of wire is fed vertically into the head. In these machines a length of the wire is severed from the strip and rotated to a position at right-angles to the direction of feed and the ends of the severed length then bent by a vertically reciprocating bar to form a staple. When a plurality of these machines or heads are arranged in tandem to simultaneously operate on the work to be stitched the heads must be spaced to provide a clearance for the severed length of wire as it is rotated to a horizontal position. Further, with these machines considerable difficulty has been experienced in gripping and holding the severed lengths of wire as they are rotated. When the lengths of wire are not properly placed irregular staples are formed having depending legs of varying length.

The present invention provides a stapling or stitching head of greater compactness which may be arranged in closer relationship to other heads of like construction. Further, the machine of the present invention avoids the necessity for rotating a severed length of wire, besides providing a novel and improved structure and arrangement of elements for forming staples from a continuous wire strip and performing a stapling operation.

The present machine comprises, in general, a frame in which the operating elements are carried, including a main driving element, a driving plate and an intermediate driving element. The continuous strip of wire stapling material is fed vertically by a reciprocating mechanism carried by the intermediate driving element which grips the wire strip during its forward or downward stroke and releases the strip during its return or upward stroke. At the end of the feeding stroke a laterally-movable holding bar is actuated to engage and hold the wire against the side of an anvil over which the staple is to be formed. Subsequent to the holding operation a laterally-movable cutter-bar is actuated to sever a length of the wire. After a length of the wire has been severed from the strip, and while it is held against the side of the anvil, a laterally-movable bender-bar is actuated to bend the vertically-extending length of wire across the upper horizontal face of the anvil. A gripper carried by the anvil is then actuated to engage the horizontal leg of the wire, and the anvil and length of wire are moved rearwardly. Upon the next succeeding stroke of the driving mechanism the length of wire extending horizontally beyond the anvil is bent downwardly over the opposite side of the anvil by a vertically-reciprocating bender-bar to complete the formation of the staple. Mechanism is provided for moving the anvil forwardly after one staple has been formed thereon and the staple is then driven into the work by a vertically-acting staple-driver. Each of the elements which acts on the wire is actuated by one or another of the three driving elements in timed relation and during the driving of the formed staple another length of wire is fed, severed and partly formed over the anvil to be driven during the succeeding stroke of the staple-driver.

*Bonnet-frame*

Referring now to the drawings, the bonnet-frame is shown as comprising a rectangular base portion 2 having a recess 3 forming oppositely disposed parallel walls 4 and 5. The spaced walls 4 and 5 extend upwardly from the rectangular base 2 and constitute guideways for embracing the operative elements of the stapling mechanism. The bonnet-frame may be attached to the machine frame 6 in any suitable manner and, as shown in Figs. 1 and 8, the attaching means comprises a bolt 7 having a T-shaped head 8 held in a similarly shaped slot in the machine frame 6 with its shank 9 extending into an aperture 10 in the rear wall of the base portion 2. The shank 9 of the bolt 7 has a semicircular recess 11 on its upper side which is engaged by a locking bolt 12 extending through the base portion 2 at right-angles to the bolt. The bolt 12 has a flat side 13 and a rounded part slightly eccentric to its axis so that the bolt may be rotated by a handle 14 to a position where the flat side clears the top of the bolt 7 whereby to release the bonnet-frame; or to a position where the rounded eccentric portion engages the recess 11 to clamp the rear face of the base 2 of the bonnet-frame against the machine frame 6.

Figure 2:
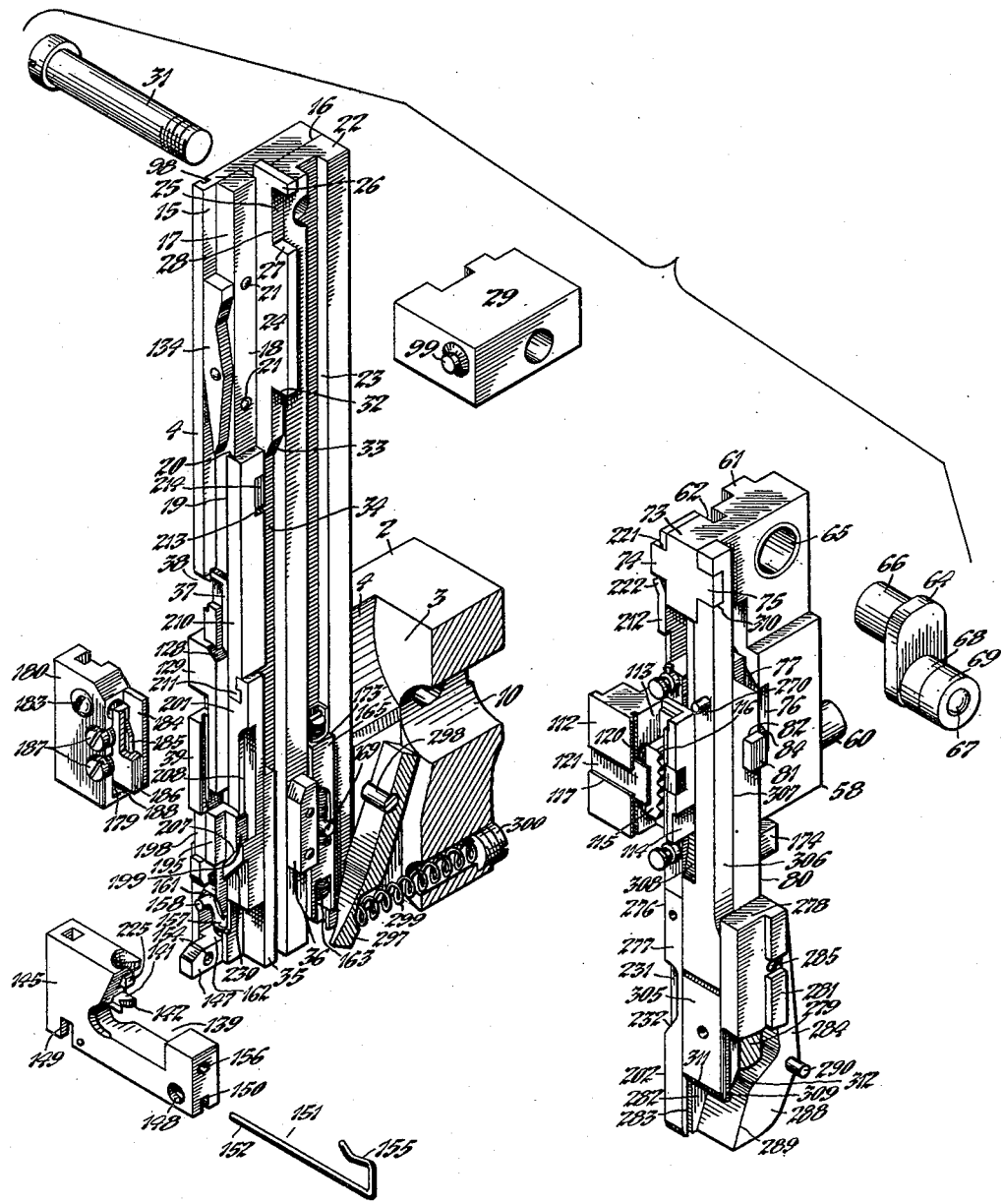
Fig. 2 is an extended composite perspective view of the bonnet-frame and the correlated operating elements of the machine.
Figure 6:
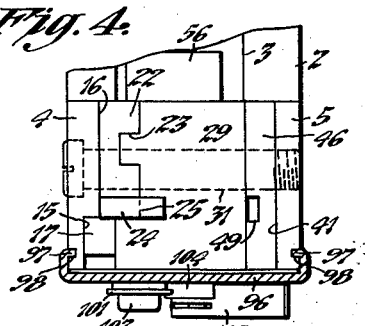
Fig. 6 is a plan view of the forward part of the stapling head with its cover plate shown in section.

As shown in Fig. 2, the inner face of the wall 4 is stepped to provide faces 15 and 16 in spaced vertical planes. A plate 17 having its inward face formed with stepped portions 18 and 19 with a shoulder 20 therebetween is mounted on the face 15 of the frame and suitably fixed to the wall 4 as by pins 21. A guide-plate 22 of a suitable bearing material, such as bronze or the like, is welded or otherwise fixed to the face 16 and its inward face has a vertically-extending groove 23. A thin plate 24 is mounted on the wall 4 in the space between the plates 17 and 22 and extends inwardly from the wall 4. The upper end of the plate 24 is slotted at 25 to provide upper and lower shoulders 26 and 27 with a side edge 28, and the slot is so positioned that the upper shoulder 26 and the inner side edge 28 lie flush with the top and inward faces of the guide-plate 22. The plate 24 is held in position by a block 29 engaged on its top and bottom by the shoulders 26 and 27 formed by the slot 25. The end face of the block 29 has tongues and grooves of a contour corresponding with the contour of the inner face of the wall 4, see Fig. 6, and the block is clamped between the walls 4 and 5 by a bolt 31 extending through apertures in the block and the respective walls. Intermediate its ends the plate 24 is cut away to form a shoulder 32 and the lower end portion is beveled to form a cam-face 33.

The forward face of the guide-plate 22 has formed thereon a rib 34 which extends from a point above the center of the wall to the lower end thereof and on the front of the rib adjacent its lower end is an inwardly-extending flange 35. On the inwardly-directed face of the guide-plate 22, forwardly of the groove 23, is a lug 36 and forwardly of the rib 34 and underlying the flange 35 is a bearing plate 37. At its lower middle section the wall 4 is of greater thickness than its upper forward section and has its outward face cut away to form a recess 38. Below the recess 38 the wall 4 has a forwardly-projecting rib 39.

Figure 3:
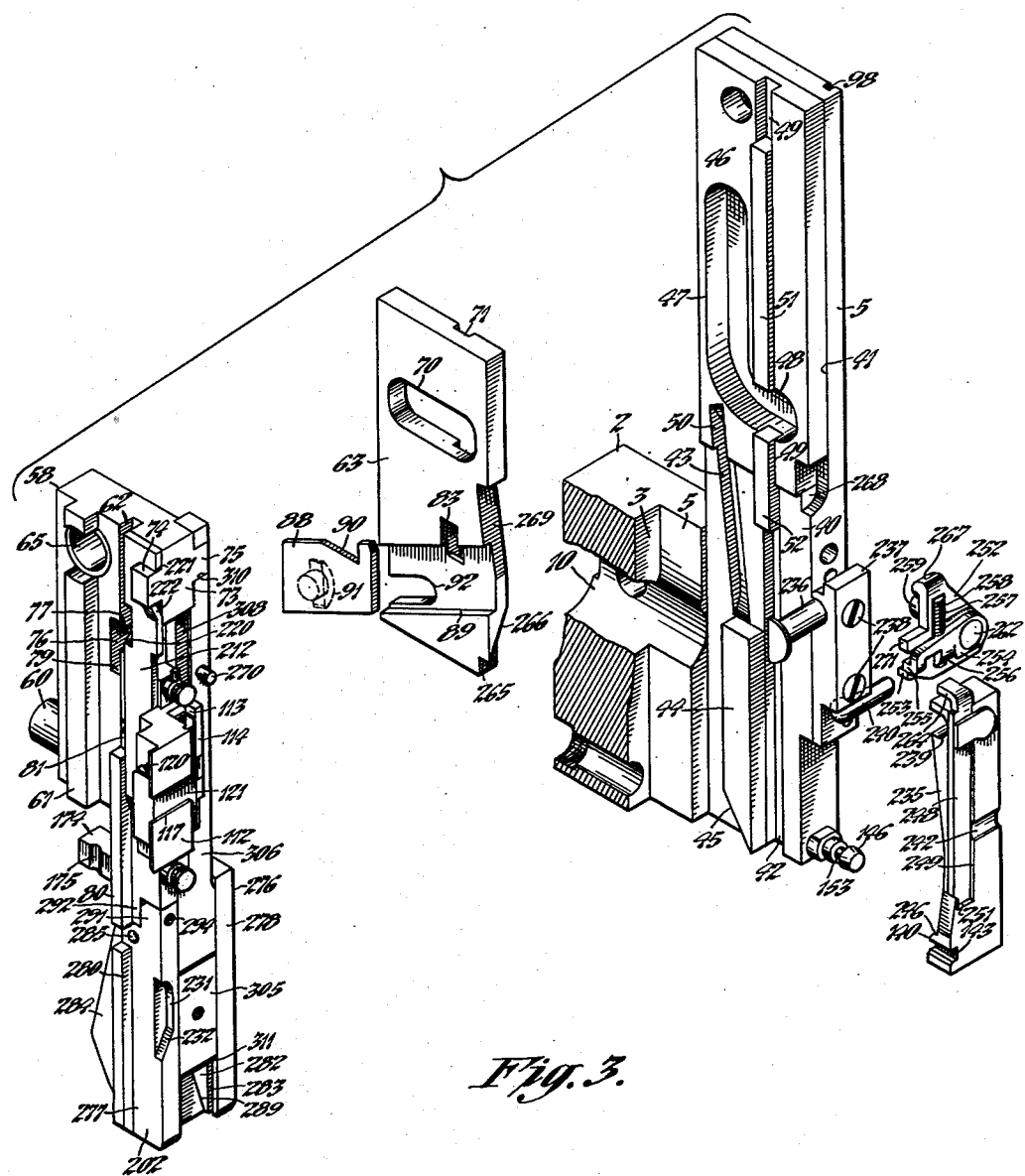
Fig. 3 is an extended composite perspective view of the bonnet-frame and operating elements of the machine as viewed from the opposite side.
Figure 4:
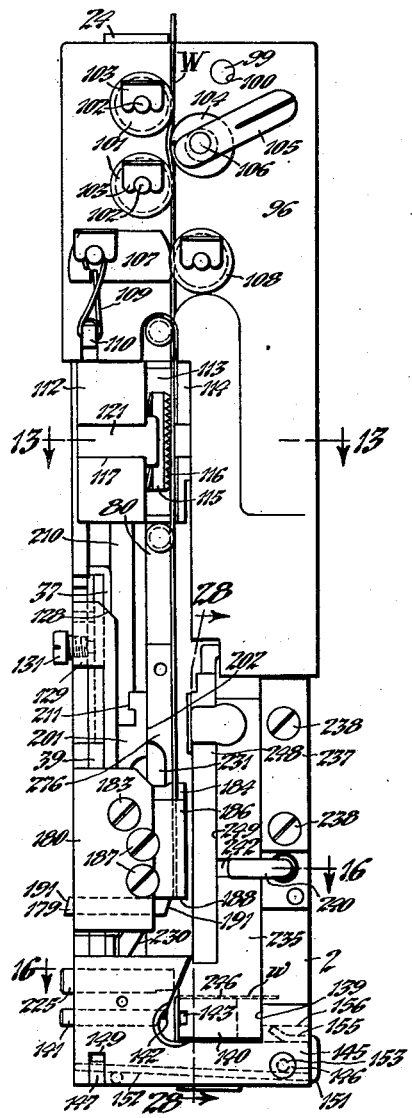
Fig. 4 is an enlarged front elevational view of the head shown in Fig. 1.

As shown in Fig. 3, the inner face of the opposite wall 5 has a lower inwardly-projecting portion 40 and an upper flat face 41. The inwardly-projecting portion 40 has a forwardly-positioned groove 42 extending vertically throughout its length and an inclined groove 43 spaced from the groove 42 and extending rearwardly. At the rear of the groove 42 and below the groove 43 is a rectangular block 44 which extends inwardly from the wall 5 with its lower end beveled to form a cam-face 45. A plate 46 is mounted on the upper flat face 41 and is held in place by the block 29 and bolt 31 extending through the assembled parts. An L-shaped slot is formed in the plate 46 having a vertical leg 47 and a horizontal leg 48 connected by a curved portion therebetween. The inner face of the plate 46 also has grooves 49 and 50 forming continuations of the grooves 42 and 43 in the lower portion 40 of the wall 5. Keys 51 and 52 are fixed in the groove 49 above and below the horizontally-extending leg 48 of the L-shaped slot with the key 52 extending into the groove 42 in the lower portion 40 of the wall 5.

*Driving mechanism*

Figure 5:
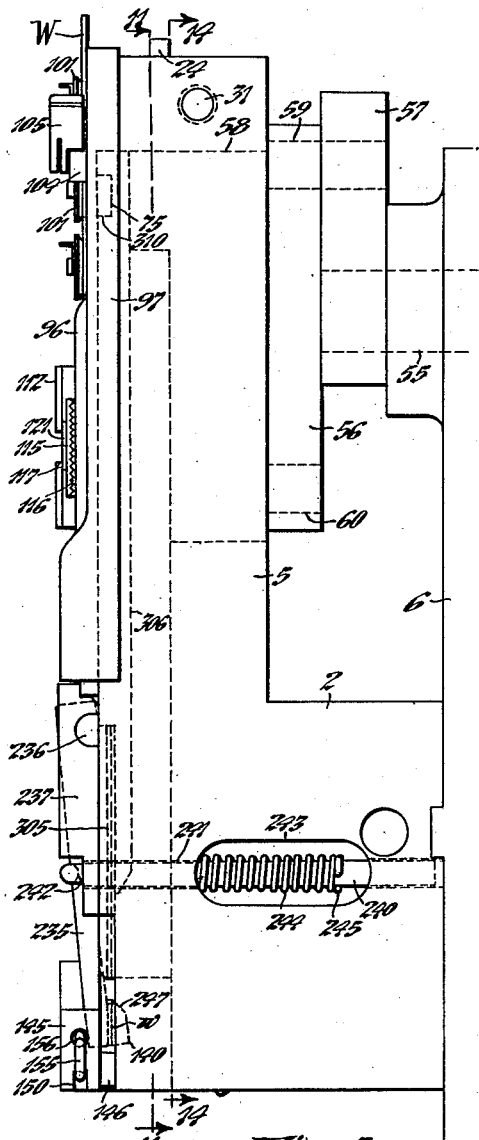
Fig. 5 is a side elevational view of the stapling head.

The stapling mechanism may be actuated by any suitable means for imparting a reciprocatory motion to the main driving element and, as illustrated in Figs. 1 and 5, this means comprises a crank-shaft 55 and link 56. The crank-shaft 55 is mounted for rotation in the machine frame 6 and has a crank-arm 57 fixed thereto and operatively connected with the main driving element 58 by the link 56 extending between pins 59 and 60 on the crank-arm and driving element, respectively. The crank-shaft 55 may be driven from any suitable source of power and to this end the shaft may carry a pulley or gear, not shown, or may be directly actuated from a prime-mover through a suitable clutch.

Figures 21, 22:
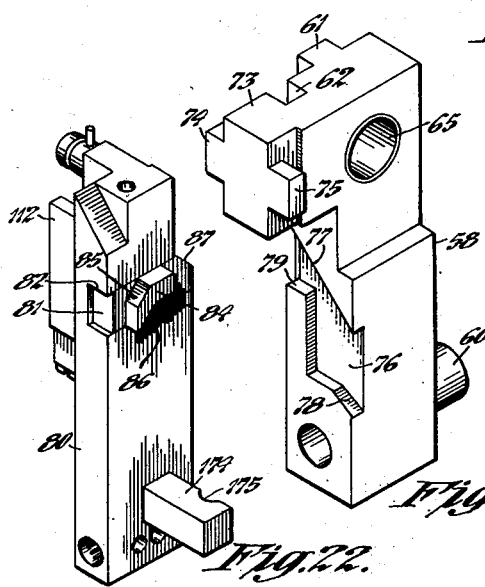
Fig. 21 is a detailed perspective view of the main driving element.
Fig. 22 is a detailed perspective view of the intermediate driving element showing it as turned ninety degrees from its operative position with respect to the main driving element shown in Fig. 21.

The main driving element 58, shown in detail in Fig. 21, is mounted in the bonnet-frame for reciprocation through a stroke equal to the length of the throw of the crank-arm 57, see Figs. 23 to 25. Referring now to Figs. 2, 3 and 21, one side of the main driving element 58 has a contour corresponding to that of the inner face of the wall 4, including a rib 61 for engaging the groove 23 in the guide-plate 22 and a recess 62 for embracing the inwardly-extending plate 24. On its opposite side the main driving element 58 has a flat face in bearing engagement with a driving plate 63 which, in turn, is slidably mounted on the plate 46 fixed to the inner face of the wall 5, see Fig. 14. The face of the driving plate 63 bearing on the fixed plate 46 has a groove 71 for engagement with the keys 51 and 52 fixed in the plate 46. The main driving element 58, driving plate 63 and fixed plate 46 are so proportioned as to provide a close sliding fit with each other and with the inner faces of the side walls 4 and 5.

The driving plate 63 is adapted to be driven through a part only of the stroke of the driving element 58 by a connecting element in the form of a rocking crank 64. To this end the driving element 58 has a bearing aperture 65 for receiving the stud 66 extending laterally from one side and end of the rocking crank 64, see Fig. 2. At its opposite end the rocking crank 64 has a pin 67 extending laterally therefrom on the opposite side from the stud 66 and the pin carries a pair of rollers 68 and 69. The plate 63 is provided with a horizontally-extending slot 70 through which the pin 67 extends and which embraces the roller 68 carried by the pin, see Figs. 10 and 11. The outer end of the pin 67 projects beyond the driving plate 63 and the roller 69 carried thereby lies in the slot 47 formed in the plate 46, see Figs. 8 and 10. When the driving element 58 is moved downwardly the rocking crank 64 is held against rotation by the engagement of the roller 69 with the sides of the vertical leg 47 of the L-shaped slot in the fixed plate 46. During this downward movement of the main driving element 58 the driving plate 63 is driven therewith by the engagement of the roller 68 with the edge of the slot 70, see Figs. 8 and 33. This driving engagement continues until the roller 69 enters the lateral extension 48 of the vertical slot 47, the slot 47 and extension 48 being connected by a curved portion to allow the rocking crank 64 to rotate and the roller 68 to move laterally in the slot 70 in the driving plate 63, see Fig. 32. The driving element 58 then moves downwardly while the driving plate 63 is held by the pin 67 and rollers 68 and 69 extending between the horizontal slots 70 and 48 of the driving plate 63 and fixed plate 46, respectively.

As most clearly shown in Fig. 21, the driving element 58 has a forwardly-projecting block 73 at its upper end with lugs 74 and 75 projecting laterally therefrom in the form of a cross. Below the block 73 the front face of the element 58 is recessed at 76 to form an upper inclined cam-face 77 and a shorter correspondingly-inclined lower cam-face 78. The recess 76 has a shoulder extending laterally from the lower cam-face 78, then upwardly to provide a clearance and outwardly at its upper end to form a shoulder 79.

An intermediate driving element 80, shown in detail in Fig. 22, is slidingly mounted on the front face of the main driving element 58 below the forwardly-projecting block 73 as illustrated in Fig. 15. The intermediate driving element 80 has a limited reciprocatory movement with respect to the main driving element 58, being driven through its forward or downward stroke by the driving plate 63 and through its return or upward stroke by the main driving element 58 in advance of the return of the driving plate. Referring now to Figs. 11, 14, 17, 21 and 22, the driving connection between the plate 63 and element 80 comprises a laterally-slidable bolt 81 mounted in a recess or slot 82 in the rearward face of the intermediate element 80 and bearing against the front face of the main driving element 58. The end of the bolt 81 is adapted to engage a rectangular slot 83 in the driving plate 63 when the bolt is slid laterally beyond the side of the intermediate member 80 in which it is carried. The bolt 81 has an integral lug 84, see Fig. 22, which extends rearwardly into the recess 76 on the driving element 58. The top of the lug 84 is formed with an inclined cam-face 85 for cooperation with the upper cam-face 77 on the driving element 58 and the bottom of the lug is provided with a cam-surface 86 for cooperation with the lower cam-face 78. A third inclined cam-face 87 is formed on the end of the sliding bolt 81 opposite from the end which engages the rectangular slot 83 in the driving plate 63.

At the end of the return stroke of the main driving element 58 its lower cam-face 78 engages the cam-face 86 on the under side of the lug 84 and slides the bolt 81 so that its end enters the slot 83 in the driving plate 63. Upon the succeeding downward stroke of the driving element 58 the driving plate 63 being connected to the driving element by the rockable crank 64 and the intermediate driving element 80 being connected to the plate 63 by the bolt 81 these several parts move as a unit until the roller 69 on the crank 64 enters the horizontal slot 48 in the plate 46.

Upon completion of the downward stroke of the driving plate 63 the intermediate driving element 80 is held from further downward movement due to its locked engagement with the plate 63 by the bolt 81. Adjacent the end of the forward stroke of the driving element 58 its cam-face 77 engages the cam-face 85 on the top of the lug 84 and moves the bolt 81 laterally to withdraw its end from the slot 83 in the driving plate 63 while locating the under face of the lug 84 above the horizontal shoulder 79. The cam-face 87 on the end of the bolt 81 then projects beyond the side of the intermediate driving element 80. Upon the return movement of the main driving element 58 the intermediate driving element 80 is carried therewith until the cam-face 87 engages the cam-face 33 at the lower end of the thin plate 24 which is fixed to the side wall 4 and projects inwardly therefrom. The engagement of the cam-face 87 with the stationary cam-face 33 causes the bolt 81 to be moved inwardly until the lug 84 lies wholly within the recess 76 in the main driving element 58, see Fig. 19. The main driving element 58 then continues its upward movement until its cam-face 78 engages the bottom cam-face 86 on the lug 84 and again moves the end of the bolt 81 into the slot 83 in the driving plate 63 which in the meantime has been raised into register therewith, see Figs. 11 and 20. In this manner the intermediate driving element 80 is caused to have an initial movement downward concurrently with the downward movement of the main driving element 58 and driving plate 63; a dwell or rest period while the main driving element completes its downward stroke; and then a return movement with the main driving element prior to the return of the driving plate 63.

Figure 17:
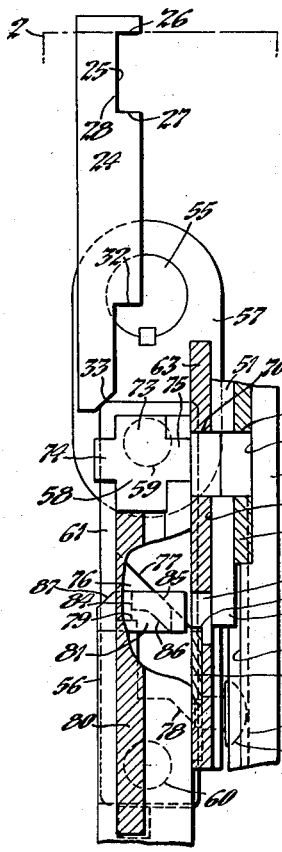
Fig. 17 is a front elevational view in section of the main driving element, driving plate and intermediate driving element and showing the relation of the elements at the end of their forward or downward stroke.
Figure 18:
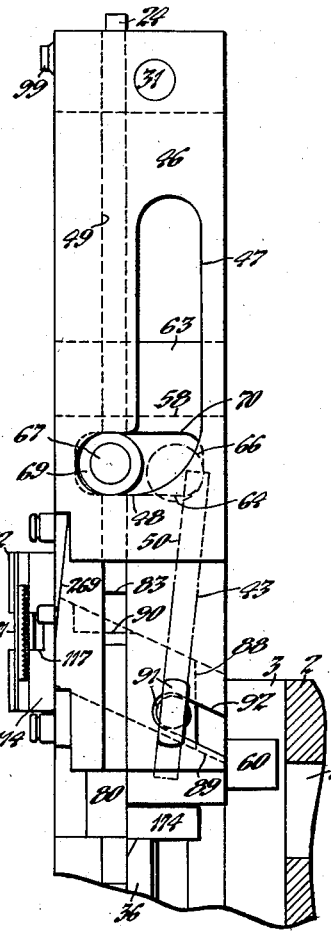
Fig. 18 is a side elevational view of the upper part of the stapling head with the outer wall of the bonnet broken away to shown the relationship of the driving elements in a position corresponding to that shown in Fig. 17.

To provide for the insertion of the end of the bolt 81 into the slot 83 during the relative movement between the plate 63 and intermediate element 80 the slot 83 has a depth greater than the thickness of the bolt. As shown in Figs. 3, 17 and 18, a sliding plate 88 is mounted on the driving plate 63 to be actuated upon the downward movement of the driving plate to decrease the depth of the slot and prevent movement of the bolt therein after the driving plate has completed its stroke. The sliding plate 88 is mounted in an inclined slot 89 on the inner face of the driving plate 63 which engages the side of the main driving element 58. The sliding plate 88 is cut away to provide an angular edge 90 which provides for varying the effective depth of the slot 83 when the plate is moved transversely in the inclined slot 89. A lug or stud 91 projecting from the side of the sliding plate 88 extends outwardly through a slot 92 in the driving plate 63 with its head engaging the sides of the inclined groove 43 and its continuation 50 on the inner face of the side wall 5 and plate 46. As the driving plate 63 is reciprocated vertically during the movement of the driving element 58 the sliding plate 88 is caused to be moved in the inclined slot 89 by the engagement of its lug 91 with the groove 43 to adjust its angular edge 90 in such manner as to vary the effective depth of the slot 83. As shown in Fig. 15, a spring-pressed plunger 93 carried by the driving element 58 engages the intermediate element 80 and a similar plunger 94 in the intermediate element engages the bolt 81 to prevent relative movement thereof until they are positively actuated.

All the mechanism which operates on the continuous strip of wire W to form and drive the staples is either carried by or actuated from one of the three driving elements 58, 63 or 80.

*Feeding mechanism*

As shown in Fig. 1, the continuous strip of wire or like material W is fed downwardly from a source of supply, mounted above, and across the front face of a plate 96 which is attached to the bonnet-frame by flanges 97 engaging forwardly-positioned grooves 98 in the side walls 4 and 5. The plate 96 is held in position by a spring-pin 99 projecting from the front of the block 29 and engaging an aperture 100 in the plate. On the front of the plate 96 are a pair of spaced tension-rollers 101 journaled on pins 102 and held in place by spring-clips 103 which engage circumferential slots in the peripheries of the pins. Opposite the spaced rollers 101 is an eccentric 104 formed as an integral part of a lever-arm 105 pivotally mounted on a pin 106. Below the tension-rollers 101 a one-way clutch 107 is provided for cooperation with a third tension-roller 108 to allow the wire to be fed downwardly while preventing its return movement. The roller 108 is similar to the rollers 101 and the clutch element 107 is in the form of a pivoted lever having an inclined end adapted to engage the roller slightly below its axis of rotation. The inclined end of the pivoted lever 107 is pressed toward the roller 108 by means of a bow-shaped spring 109 having one end fixed to an abutment 110 and the other end engaging a recess in the lever.

The wire strip W is fed between the two rollers 101 and the eccentric 104 and then downwardly between the inclined end of the pivoted lever 107 and the roller 108. The eccentric 104 may be adjusted about the pivot 106 to provide the desired tension and as the wire is drawn across the tensioning rollers 101 the lever 107 yields against the action of the spring 109 to allow the wire to be fed downwardly. Any tendency of the strip W to move upwardly will cause the lever 107 to grip the wire against the roller 108 to prevent its retrogressive movement.

Below the tensioning device the wire is engaged by a reciprocating feeding mechanism which grips the wire to move it downward and releases the wire upon its return movement. The feeding mechanism is mounted on a block 112 formed integrally with or otherwise fixed to the front face of the intermediate driving element 80. As shown in Figs. 1, 2, 4, 7 and 13 the block 112 has a vertically-extending slot or recess 113 through which the wire extends and against the side wall 114 of which the wire is clamped during the feeding stroke. A T-shaped gripper 115 slidably mounted in the block 112 has a serrated face 116 on its head for gripping the wire and holding it against the wall 114, see Fig. 7. As shown in Fig. 15, the block 112 has a horizontal slot 117 for receiving the shank-portion 118 of the gripper 115 and a pair of pockets 119 for holding compression springs 120 which bear against the rearward side of the serrated head, see also Figs. 7 and 13. The gripper 115 is held in position by a lock-plate 121 extending over the front of the shank with its edges engaging grooves in the sides of the slot 117 in the block and its end bent at right-angles to engage and hold the ends of the springs. The gripper 115 is thus resiliently urged into engagement with the wire to clamp it against the opposite wall 114 of the slot.

As shown in Fig. 7, the block 112 is recessed on its side to provide an arcuate face 122 for receiving a correspondingly-shaped arcuate slide 123. The slide 123 is so proportioned that one end will always project beyond the side of the block 112. Intermediate its ends the slide 123 is cut away to form a recess 124, see Fig. 24, with one side beveled to provide a cam-face 125. On the rearward side of the shank 118 of the gripper 115 is a lug or projection 126 of a shape corresponding to that of the recess 124 thus providing a cam-face 127 adapted to cooperate with the cam-face 125 on the slide.

With the lug 126 positioned in the recess 124 the springs 120 resiliently urge the gripper 115 to the right, as viewed in Fig. 23, to grip the wire between the serrated face 116 and the wall 114. When, however, the arcuate slide 123 is moved to the position shown in Fig. 24 the gripper 115 is withdrawn from engagement with the wire due to the sliding engagement of the beveled cam-faces 125 and 127.

The gripper 115 is caused to release the wire at a predetermined point in the forward or downward stroke of the intermediate driving element 80 on which the gripper is carried, by the engagement of the lower projecting end of the arcuate slide 123 with the inclined face 128 of a stationary abutment 129. This engagement causes the slide 123 to be moved to the position shown in Fig. 24 so that its opposite or upper end projects beyond the side of the block 112.

The abutment 129 has a grooved body portion embracing the forward edge of the wall 4 of the bonnet-frame at the recessed portion 38 as shown in Figs. 2 and 41. The abutment 129 is thus adapted for vertical adjustment along the wall 4 and may be locked in its adjusted position by a set-screw 131 extending through its body portion and impinging against the side of the wall. By such adjustment the actuation of the slide 123 may be timed to move the gripper 115 to release the wire W after a predetermined length has been fed in accordance with the size of staple to be formed.

During the return stroke of the intermediate element 80 the gripper 115 is held in its released position and the block 112 slides back on the wire strip W. As the intermediate driving element 80 comes to rest the slide 123 is moved in the opposite direction to release the gripper 115 by the engagement of the upper end of the slide with a pivoted lever 134, see Fig. 7. The lever 134 is pivotally mounted on the forward face of the plate 17 fixed to the side wall 4 of the bonnet-frame. The lower beveled end of the lever 134 is adapted for swinging movement into engagement with the projecting end of the arcuate slide 123 while the opposite end of the lever has a cam-face 135 adapted to be engaged by the lug 74 on the forwardly-projecting block 73 of the main driving element 58 during the continued movement of the latter after the intermediate driving element 80 has come to rest. When the arcuate slide 123 is moved by the lever 134 to the position shown in Fig. 7, the lug 126 enters the recess 124 and the gripper 115 is urged forwardly by the springs 120 to again grip the wire against the wall 114.

*Holding mechanism*

The strip of wire W is advanced by the feeding mechanism to carry its lower end adjacent the side of an anvil 140, to be later described in detail, and the wire is then gripped and clamped against the anvil. As shown in Figs. 24 and 37, the holding means is in the form of a bar 141 having a forked end 142 for straddling and engaging the wire to clamp it against the side of the anvil 140; a recess 143 being provided in the anvil to receive the end 142 of the bar 141. The holding bar 141 engages the wire W as it is fed vertically and preferably it is also adapted to bend the end of the wire slightly forward with respect to the direction in which it is fed. To this end the holding bar 141 may be so positioned with respect to the wire W that the rearward inclined or angular edge of its forked end will engage the wire and cam the end thereof forwardly as the bar moves into holding engagement therewith. However, when the staple is to be formed with comparatively long legs the forked end of the bar is preferably shaped with the rearward inclined face of greater length than the forward face and with the planes of the faces intersecting in a line angularly disposed with respect to the direction of the wire feed, see Fig. 37. The bar 141 will then hold the wire W against the side of the anvil 140 with the end extending at a slight angle with respect to the direction in which the wire is fed as shown in Fig. 31, for a purpose as will be later explained.

Referring to Figs. 23, 24 and 27, the bar 141 is shown as slidably mounted in a grooved recess 144 in the rearward face of a block 145 detachably mounted at the lower forward end of the walls 4 and 5. The block 145 has an opening 139 intermediate its ends for receiving the forming anvil 140 previously referred to. The block 145 is mounted on a pin 146 and lug 147 which project forwardly from the walls 4 and 5 and engage respectively with an aperture 148 and slot 149 in the block. The lower face of the block 145 has a groove 150 extending throughout its length at right-angles to the direction of the slot 148 to adapt it to receive a U-shaped pin 151.

One leg 152 of the pin 151 engages a peripheral groove 153 in the pin 146 and extends through a hole 154 in the forwardly-projecting lug 147 to lock the block in position. The opposite leg 155 of the pin 151 engages a recess 156 in the block 145 and is bent or crooked to frictionally engage the sides of the recess to hold the pin in position.

The bar 141 is actuated by a crank-arm 157 having a pin 158 at its end engaging a slot 159 in the rearward face of the bar, see Figs. 23, 24, 27 and 37. As shown in detail in Figs. 34 through 37, the crank-arm 157 extends from the end of a shaft 160 journaled in a recess 161 formed in the wall 4. The shaft 160 is held in the recess 161 by a bottom ledge 162 at the rear of the lug 147 and by the lower end of the bearing plate 37, see Fig. 2. The opposite end of the shaft 160 has a crank-arm 163 which extends through a slot 164 in the guide-plate 22 and lies in the lower end of the groove 23 thereof. A hollow plunger 165 is mounted in the groove 23 and adjacent its lower end has an opening through which the crank-arm 163 projects. A pin 166 carried by the plunger 165 engages the under side of the crank-arm 163 and acting against its upper side is a spring 167 pocketed in the bore of the plunger. The upper end of the spring 167 is held against a cross-pin 168 in the plunger 165 and its lower end bears against the head 176 of a pin 177 enclosed by the spring. The head 176 of the pin 177 engages against the upper side of the crank-arm 163. The plunger 165 is resiliently connected with a stationary abutment 169 projecting inwardly from the guide-plate 22 by means of a spring 170 extending between the abutment and a pin 171 in the plunger; the arrangement of the spring 170 being similar to that of the spring 167. The plunger 165 is held in position in the groove 23 by the pins 166 and 171, before mentioned, which extend beyond the sides of the plunger and engage relatively narrow grooves 172 in the forward and rearward faces of the groove 23, see Figs. 16 and 35. The plunger 165 is cut away on its upper end to provide a shoulder 173 adapted to be engaged by a rearwardly-extending arm 174 on the intermediate driving element 80, see Figs. 15 and 22. As shown in Fig. 22, the arm 174 has an arcuately-shaped recess 175 for embracing the side of the spring 170 and engaging the shoulder 173 of the spring-pressed plunger 165. Thus, toward the end of the downward stroke of the intermediate driving element 80 the spring-sustained plunger 165 is engaged by the arm 174 and depressed thereby whereby to rock the crank-arm 163 downwardly to rotate the shaft 160 and turn the crank-arm 157. Through the connection of the crank-pin 158 with the slot 159 in the bar 141 the latter is moved laterally into engagement with the wire W to clamp it against the side of the anvil 140. The bar 141 will continue to hold the wire until the main driving element 58 has completed its downward movement and commenced a return stroke, after which the shaft 160 and its crank-arm 157 will be rotated in the opposite direction by the action of the spring 170 to thereby move the holding bar 141 laterally in the opposite direction to release the wire.

*Wire-cutting mechanism*

A cutting mechanism for severing the length of wire advanced by the feeding means is actuated near the end of the downward stroke of the main driving element after the gripper 115 has released the wire and the holding bar 141 has been actuated. Referring to Figs. 38 and 42, the cutting mechanism is herein shown as comprising a laterally-movable cutter-bar 179 slidably mounted in a block 180 which is adjustably mounted on the forwardly-extending rib 39 on the wall 4 of the bonnet-frame below the adjustable abutment 129. The block 180 is adjusted vertically on the rib 39 to a position corresponding with the position of the adjustable abutment 129 to regulate the length of wire w to be severed. The block 180 is locked in its adjusted position by a wedge 181 having a beveled lip 182 which is clamped in engagement with a correspondingly-shaped groove in the side of the rib 39 by a screw 183, see Fig. 40. A ledge 184 extends inwardly from the side of the block 180 and has a rib 185 projecting forwardly from its face, see Fig. 2. A channel-shaped element 186 straddles the sides of the rib 185 abutting the ledge 184 and is locked in position on the block by screws 187. A space intervenes between one side of the channel-shaped element 186 and the side of the rib 185 to provide a guideway through which the wire passes. The edge of the flat face 188 on the bottom of the block 180 provides a stationary cutter which cooperates with the movable cutter-bar 179 to shear the wire. The hollow block 180 has bearing apertures 190 of a contour corresponding to that of the cutter-bar 179 for slidably mounting the bar to adapt it for lateral movement at right-angles to the direction of movement of the wire.

The cutter-bar 179, illustrated in detail in Fig. 42, is of rectangular cross-section with beveled ends to provide cutting edges 191 for cooperation with the edge of the flat face 188 of the element 186. The rearward face of the cutter-bar 179 has a rectangular slot 192 for engagement by an actuating means to be next described, the slot being centrally positioned to provide for reversing the bar to employ the opposite cutting edge thereof.

Referring to Figs. 38, 39 and 42, the cutter-bar 179 is shown as mounted to slide in the inclined bearing apertures 190 of the block 180 to provide a shearing action between the cutting edge 191 and the flat face 188 with the sharp edge of the bar engaging the wire at an angle. The bar 179 is actuated by a member 193 pivoted on a vertical axis for movement in a horizontal plane and having an inwardly-directed flange 194 with a forwardly-projecting lug 195 for engaging the slot 192 in the bar. The wall 4 of the bonnet-frame is cut away at 196 to allow a limited pivotal movement of the member 193 which has its rearward end loosely positioned in a recess 197 formed between the inner face of the wall 4 and the guide-plate 22. The pivoted member 193 is held in place by a strut 198 on the rib 39 having its rearward face extending across the front of the flange 194 on the pivoted member and its front face providing a backing for the cutter-bar 179. On the rearward face of the inwardly-directed flange 194 is a projecting lug 199 having a cam-face 200 adapted to be engaged by an actuating means to move the pivoted member in a horizontal plane to actuate the cutter-bar 179 to sever a length of the wire, see also Figs. 7 and 24.

Referring to Figs. 2, 7, 16, 23 through 25, and 42, the actuating means for the pivoted member 193 comprises a bar 201 slidably mounted in a groove formed between the flange 35, bearing plate 37 on the wall 4 and the flat face 202 of a bender-bar to be later described. The bar 201 has an inclined slot 205 extending across its forward face to form opposite cam-faces 206 and 207, and a cut-away portion 208 to provide clearance. The engagement of the cam-face 206 with the cam-face 200 upon downward movement of the bar 201 causes the pivoted member 193 to be moved inwardly and the cutter-bar 179 to be actuated by the lug-and-slot connection 195 and 192, see Figs. 24 and 39. After the actuation of the cutter-bar 179 the recessed portion 208 of the bar 201 allows the latter to continue its downward movement as shown in Fig. 25. Upon return movement of the bar 201 the cam-face 207 engages the inner edge 209 of the rearwardly-projecting lug 199 on the pivoted member 193 to move the latter to return the cutter-bar 179 to an inoperative position, see Figs. 7 and 42.

The bar 201 is actuated by an extension-bar 210 having a tongue-and-groove connection therewith at 211. The extension-bar 210 is slidably mounted between the flat face 19 of the plate 17 below the shoulder 20 and a plate 212 depending from the main driving element 58, see Figs. 23 to 25. Adjacent its upper end the rearward face of the extension-bar 210 has a slot 213 in which is mounted a rocking key 214. As shown most clearly in Fig. 24, the upper face of the slot 213 and the end of the key 214 are rounded to provide a pivotal connection while the side edges of the key are inclined outwardly toward the bottom. At its lower end the rocking key 214 has beveled cam-faces 215 and 216. The upward movement of the extension-bar 210 is limited by the engagement of its end with the shoulder 20 between the stepped portions 18 and 19 of the plate 17 and when the bar is so positioned the slot 213 registers with a slot 217 in the plate 17, this latter slot having a lower beveled face 218 of a contour corresponding to that of the cam-face 215. The upper end of the extension-bar 210 extends outwardly beyond the shoulder 20 and is engaged by the laterally-extending lug 74 on the main driving element 58 as the latter moves downwardly. A slot 219 is formed in the plate 212 to register with the opposite side of the slot 213 when the driving element 58 is in a position to engage and drive the extension-bar downwardly. The lower edge of the slot 219 is beveled to provide a cam-face 220 of the same contour as that of the cam-face 216 on the rocking key 214.

As the main driving element 58 descends from the position shown in Fig. 23 to that shown in Fig. 24 the extension-bar 210 s held from movement by the engagement of the cam-face 215 on the rocking key 214 with the cam-face 218 in the fixed plate 17, the key being held so positioned by the engagement of the flat face of the plate 212 with the opposite face of the key. Upon continued movement of the driving member 58 downwardly the lug 74 engages the end of the extension-bar 210 and, due to the sliding engagement between the cam-faces 215 and 218, causes the rocking key 214 to be shifted from the position shown in Fig. 24 to that shown in Fig. 25, the slot 219 then being in register with the key. The rocking key 214 will then project into the slot 219 in the plate 212 with the cam-face 216 engaging the cam-face 220 at the lower end of the slot, the key being held in this position by the engagement of its opposite side with the flat face of the plate 17. The driving element 58 then directly actuates the bars 210 and 201 and the cutting bar 179 to sever the length of wire advanced by the feeding mechanism, but subsequent to the actuation of the feeding mechanism to release the wire as shown in Fig. 24.

The main driving element 58 continues its downward movement to the end of its forward stroke and commences its upward return stroke, and due to the engagement of the cam-face 220 on the plate 212 with the cam-face 216 on the rocking key 214 the plate 212 and bar 210 are returned as a unit until the end of the bar engages the shoulder 20. Continued upward movement of the driving element 58 and plate 212 causes the rocking key 214 to be shifted to the position shown in Fig. 24 where it is held by the engagement of the flat face of the plate 212 with the flat face on the side of the key. In this manner the cutting mechanism has a limited movement near the end of the downward stroke of the main driving element 58, being returned to its normal position and reset for a subsequent operation by the upward movement of the driving element. The plate 212, besides serving as a return actuator for the extension-bar 210, also provides a bearing surface for engaging the side of the intermediate driving element 80. The plate 212 is attached to the driving element 58 by the opposite shoulders of a slot 221 that embraces the lug 74, a slitted portion of the plate being bent outwardly at 222 with its edge frictionally engaging the under side of the lug.

Laterally-movable bender-bar

After the length of wire W has been advanced, clamped against the anvil 140 and a length severed therefrom it is acted upon by a laterally-movable bender-bar 225 to fold the vertically-extending portion of the wire *w* across the top face of the anvil prior to its engagement by the vertically-reciprocating bender-bar. As shown in Figs. 23 and 27 the laterally-movable bar 225 is carried in a slotted recess 226 in the rear face of the block 145, previously described, above the laterally-movable holding bar 141. Between the holding bar 141 and the bender-bar 225 is a screw 227 screwed into the block 145 with the under side of its beveled head overlying recesses in the respective bars to hold them in the slotted recesses 144 and 226 while allowing lateral movement thereof, see Fig. 27. Extending rearwardly from the bender-bar 225 is a lug 228 having an inclined cam-face 229, see Figs. 23, 24, 25, 27 and 42.

The laterally-movable bender-bar 225 is actuated by a cam-face 230 at the lower end of the actuating bar 201 previously described. Upon downward movement of the bar 201, after the actuation of the cutter-bar 179, the cam-face 230 engages the cam-face 229 on the lug 228 and moves the bar 225 laterally to the right, as viewed in Fig. 25. During this lateral movement of the bar 225 its end engages the wire *w* and folds or bends it over the top of the anvil 140.

Forming anvil

The forming anvil 140 across which the wire *w* is bent to form a staple is formed on or attached to the end of a lever 235 and is adapted for movement from a forward position where the wire is received to a rearward position below a vertically-movable bender-bar and staple-driver. Referring to Figs. 3, 4, 5 and 28, the anvil 140 is shown as comprising a rectangular block extending rearwardly from the lever 235 at its lower end. As shown in Fig. 3, the lever 235 is pivotally mounted on a half-round pin 236 projecting inwardly from a block 237 rigidly fixed to the front face of the wall 5 of the bonnet-frame by screws 238. The lever 235 is of generally rectangular shape with a rounded groove 239 at its upper end for embracing the pin 236 and having its lower end shaped to a contour corresponding with that of the opening 139, previously referred to as formed in the block 145 shown in Fig. 27. The lever 235 is resiliently urged rearwardly by a rod 240 mounted in a bore 241 in the wall 5 of the bonnet-frame and having its forward end bent at right-angles to engage a groove 242 on the front face of the lever. As shown in Figs. 5 and 16, the rod 240 extends through a recess 243 in the bonnet-frame in which is mounted a compression spring 244 having one end abutting the end wall of the recess and its opposite end engaging an abutment 245 on the rod. In this manner the lever is continuously urged to its rearward position shown in Fig. 5.

The anvil-block 140 has a horizontally-extending recessed ledge or seat 246 of a width corresponding to the width of the wire strip and adapted to receive the length of wire initially bent over across the top of the anvil. Rearwardly of the horizontal recessed seat 246 the anvil has an inclined face 247 that is engaged by the staple-driver to be later described, to cam the anvil forwardly during a staple-driving operation.

After a length of wire has been advanced, held, and bent across the top face of the anvil while the latter is in its forward position, shown in Figs. 25 and 31, the wire is gripped and held against the anvil by the end of a gripper-bar 248. The gripper-bar 248 is carried by the lever 235, being mounted for vertical reciprocation in a groove 249 on the forward face thereof. As most clearly shown in Figs. 28 through 31, the reciprocating gripper-bar 248 has a curved end or beak 250 that extends through an aperture 251 in the lever 235. As shown in Fig. 28, the curved beak 250 of the bar 248 is in position to engage and hold a length of the wire *w* against the horizontally-extending recessed seat 246. However, when the gripper-bar 248 is slid upwardly to the position shown in Fig. 29 the engagement of its curved beak 250 with the edge of the aperture 251 in the lever 235 moves it out of the way above the seat 246 while the wire is being initially bent by the laterally-movable bender-bar 225. As shown in Figs. 24 and 30, the anvil 140 is in position to receive a length of wire *w* to be folded or bent laterally across the horizontal seat 246, and as shown in Figs. 25 and 31 the gripper-bar is moved downwardly to grip the horizontal portion of the wire after it has been bent across the anvil.

Referring now to Figs. 25, 26 and 28, the gripper-bar 248 is reciprocated in timed relation to the actuation of the laterally-movable bender-bar 225 by a two-part lever 252 pivotally mounted on the front face of the wall 5 of the bonnet-frame. As shown in Fig. 26, the pivoted lever 252 comprises a main portion of triangular shape having a jaw 253; and a relatively movable arm 254 having a cooperating jaw 255. The arm 254 is mounted on the forward side of the lever 252 and has a lug 256 projecting into the bottom of a slot 257 in the lever. Between the upper end of the slot 257 and the lug 256 there is provided a spring 258 for moving the jaw 255 into engagement with the jaw 253. As shown in Figs. 23 and 32, both the lever 252 and the arm 254 are mounted on a common pivot-pin 259 projecting forwardly from the wall and having a bearing portion 260 extending through a hole 261 in the lever 252 and a reduced bearing portion 262 extending through an aperture 263 in the arm 254. As herein illustrated the end of the reduced bearing portion 262 is riveted over to form a tapered head seated in the chamfered aperture 263. The pivot-pin 259 and lever 252 are loosely mounted on the wall 5 and held in position by the upper recessed end of the block 237 as shown in Figs. 32 and 33. As shown in Fig. 28, the upper end 264 of the gripper-bar 248 is bent rearwardly and inserted between the jaws 253 and 255 of the lever 252 which tightly grip and resiliently hold the end of the gripper-bar upon pivotal movement of the lever 252 either about the axis of its pivot 259 or in a plane at right-angles in a movement about the axis.

The lever 252 is swung about its pivot under the action of the driving plate 63. As shown in Figs. 3, 7 and 32, the forward edge of the driving plate 63 is cut away at 265 to provide an inclined cam-face 266 which engages a rearwardly-directed lug 267 on the lever 252. At the beginning of the forward or downward stroke of the main driving element 58 and the driving plate 63 connected thereto the cam-face 266 engages the lug 267 and rocks the lever 252 on the pivot-pin 259 to the position shown in Figs. 23 and 24. When the lever 252 is moved to this position the lug 267 enters a cut-away portion 268 in the front face of the wall 5 and lower end of the plate 46 to provide clearance so that the driving plate 63 may continue its downward movement. Due to the engagement of the end 264 of the gripper-bar 248 by the jaws 253 and 255 of the lever 252 the bar is raised to the position shown in Fig. 29.

Upon continued movement of the main driving element 58 and its associated parts a length of the wire strip W is fed, held and severed and the severed length $w$ bent across the top of the anvil 140 while the gripper-bar 248 is held in inoperative position. To provide for a return movement of the lever 252 to the position shown in Fig. 7 the forward face of the driving plate 63 is rearwardly inclined at 269, as most clearly shown in Figs. 3, 32 and 33, so that at the end of the downward stroke of the plate its face adjacent the lug 267 is positioned flush with the bottom of the cut-away portion 268. Upon subsequent downward movement of the main driving element 58 to a point adjacent the end of its stroke and just prior to the rearward movement of the anvil-lever 235, a pin 270 carried by the staple-driver 305, to be later described, engages a lug 271 on the lever 252 and moves the latter about its pivot to the position shown in Fig. 25 where the lug 267 overlies the forward face of the driving plate 63. The rocking of the lever 252 causes the gripper-bar 248 to be moved downwardly to the position shown in Fig. 31 where the curved end 250 engages and holds the horizontal leg of the wire $w$ against the horizontal seat 246 on the anvil-block 140.

Upon the return stroke of the driving plate 63 to the position shown in Figs. 32 and 33 the inclined face 269 on the driving plate 63 rides under the lug 267 and the lever 252 is sufficiently loose on the bearing portion 260 of the pin 259 to allow it to pivot at right-angles to the axis of the pin. A spring-pressed plunger 272 in the wall 5 of the bonnet-frame engages the rear face of the lever 252 at a point on the side of the pivot 259 opposite from the lug 267 for holding the lever with said lug in operative position with respect to the driving plate 63. In this manner the anvil-block 140 when in its forward position is adapted to receive a length of the wire which is bent horizontally over the shoulder 246 and then gripped by the reciprocating bar 248 during the rearward movement of the anvil.

*Vertically-acting bender-bar*

A reciprocating bender-bar 276 is provided for cooperation with the anvil-block 140 to complete the formation of the staple by bending the horizontally-extending end of the wire downward against the side of the anvil, whereafter it holds the staple in position to be driven. The vertically-actuated bender-bar 276 extends across the bonnet-frame between the side walls 4 and 5 and comprises legs 277 and 278 connected by an integral web 279, see Figs. 2, 11 and 16. The outer faces of the legs 277 and 278 have splines 280 and 281 that slidably engage the groove between the flange 35 and forward face of the guide-plate 22 in the wall 4, and the groove 42 on the inner face of the wall 5, respectively. The inner faces of the legs 277 and 278 forwardly of the web 279 provide a slot or guideway 282 and these faces have grooves 283 in which the formed staple $s$ is held, see Figs. 12 and 16.

As shown in Figs. 28 to 31, a staple-supporter 284 in the form of a pawl is pivotally mounted on a pin 285 extending through the legs 277 and 278 of the bender-bar 276 and a bore in a bearing lug 286 on the supporter extending forwardly between the legs above the web 279. The supporter 284 extends downwardly at the rear of the bender-bar 276 and terminates in a head 288 projecting forwardly between the legs 277 and 278 of the bender-bar 276 below the web 279. The upper face of the head 288 is inclined to provide a cam-face 289 for cooperation with the staple-driver, later to be described, and on one side at the rear of the head there is provided a laterally-extending pin 290 for cooperation with the rearward face of the block 44 extending inwardly from the wall 5.

Figures 11, 12:
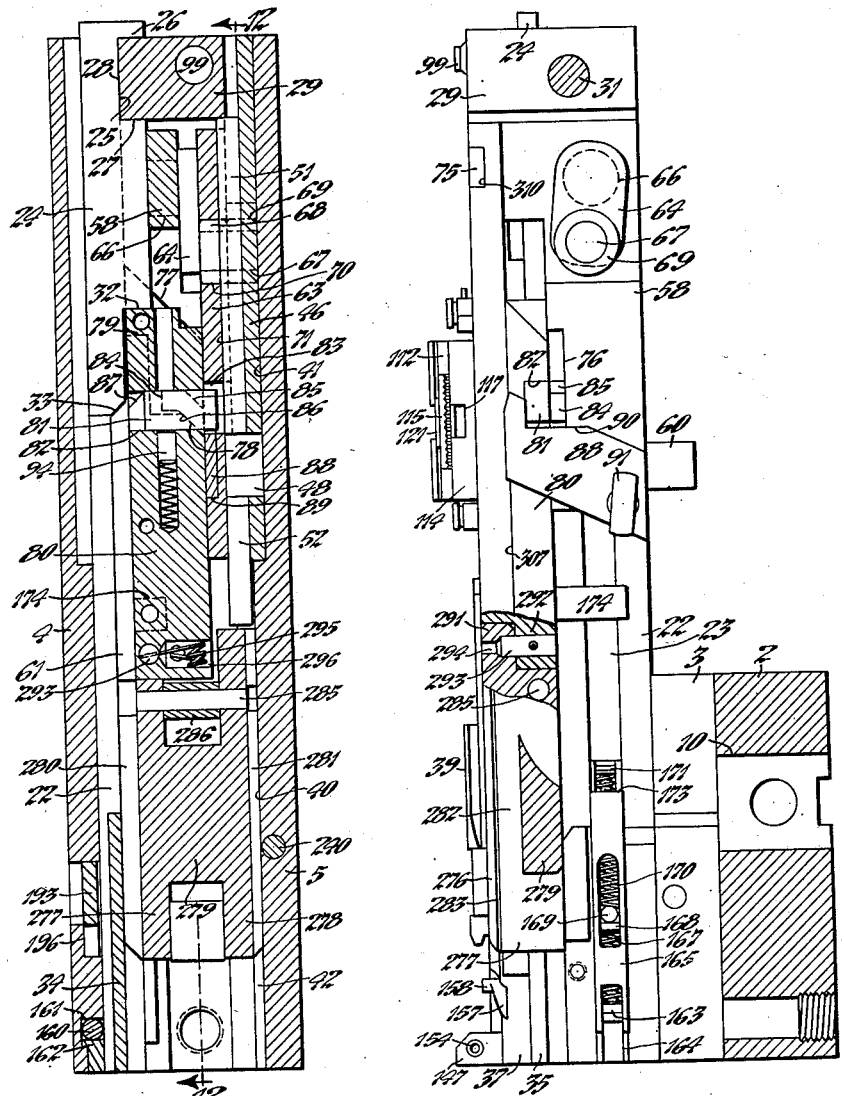
Fig. 11 is an elevational view of the head in section taken on line 11—11 of Fig. 5 and showing the sliding bolt for connecting the driving plate and the intermediate element.
Fig. 12 is a side elevational view in section taken on line 12—12 of Fig. 11 and showing the relation of the sliding bolt with respect to the main driving elevent and intermediate driving element.
Figure 13:
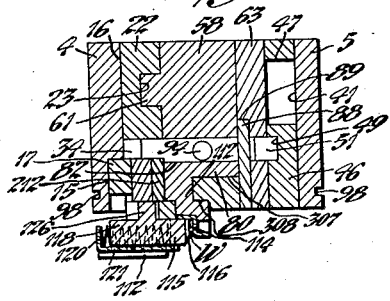
Fig. 13 is a plan view of the head in section taken on line 13—13 of Fig. 4 and showing the feeding gripper engaging the wire strip.

The bender-bar 276 is connected to the intermediate driving element 80 for movement therewith. As shown in Figs. 3, 11 and 12, the upper end of the leg 277 and lower end of the intermediate driving element 80 are cut away to form interfitting tongues 291 and 292 that are connected by a pin 293 extending therebetween. The pin 293 is carried in an aperture in the driving element 80 and has a tapered end engaging the bottom of a recess 294 in the tongue 291. The pin 293 is resiliently urged forwardly by a coil-spring 295 carried in a pocket 296 in the intermediate driving element 80 and having one end fixed to the wall of the pocket and its other end extending into a hole in the side of the pin. In this manner the pin 293 connects the intermediate driving element 80 and the bender-bar 276 and tends to force the two elements away from each other to insure a frictional engagement of the elements with the grooves in which they slide.

Upon the downward stroke of the main driving element 58 and the intermediate driving element 80, by its connection through the driving plate 63, the bender-bar 276 moves from the position shown in Fig. 28 to that shown in Fig. 29. This movement of the bender-bar with respect to the anvil-block 140 causes it to engage the lateral extension of the wire $w$ held on the horizontal seat 246 to bend it downwardly in the groove 283 to form the staple $s$. Due to the fact that the anvil 140 is moved in an arc from a forward to a rearward position after the wire has been bent across the top of the anvil and before the lateral extension of the wire is bent by the bender-bar 276 to form the second leg of the staple this last formed leg will be offset at a slight angle with respect to the first formed leg. When the legs of the staples are relatively short this difference in angularity is immaterial as both legs will be held in the opposite grooves 283 in the bender-bar 276 and driven therefrom in parallel relationship even though a residual twist will be present in the staple. However, this condition is preferably corrected by the initial bending of the lower end of the wire W forwardly through the engagement of the longer rearwardly-inclined face of the holding bar 141 as previously explained. When the wire is thus initially bent to form the first leg of the staple this leg will be brought into alinement with the groove 283 in the bender-bar as the anvil 140 is moved from its forward to its rearward position. The two depending legs of the completely formed staple will thus be in alined parallel relationship without any inherent or residual twist.

During the downward movement of the bender-bar 276 the pin 290 slides on the face of the block 44 and holds the head 288 of the staple-supporter 284 at the rear of the guideway 282. Upon continued downward movement of the bender-bar 276 to the position shown in Fig. 30 the pin 290 in the staple-supporter 284 engages the inclined face 45 on the block 44 which allows the head 288 to move to a position below the staple then supported in the grooves 283 in the inner faces of the legs 277 and 278. The head 288 of the staple-supporter is moved to this position below the formed staple by a spring-operated lever 297 pivotally mounted on a pin 298 projecting from the base portion 2 of the bonnet-frame, see Fig. 8. The lever 297 is urged forwardly by a compression-spring 299 pocketed in a bore in the base portion 2 of the bonnet-frame and held by a screw 300. Upon the return movement of the bender-bar 276 the pin 290 in the head 288 of the supporter 284 engages the cam-face 45 on the block 44 to move the supporter rearwardly into its inoperative position. As shown in Figs. 23 through 25 the forward face of the vertically-movable bender-bar 276 is recessed at 231 to provide clearance for the lug 228 on the rearward face of the laterally-movable bender-bar 225, the bottom face 232 of the recess being inclined to adapt it to engage the bottom edge of the lug upon the return movement of the bar 276 to move the bar 225 to its inoperative position.

Staple-driver

The staple-driver 305 is constructed in the form of a relatively thin flat blade detachably connected with the lower recessed end of an actuating bar 306. As shown in Figs. 2, 7, 10 and 16, the actuating bar 306 is slidably mounted at its lower end in the slot or guideway 282 between the legs 277 and 278 of the bender-bar 276 and at its upper end in a groove 307 on the front face of the intermediate driving element 80; the actuating bar 306 being grooved at 308 to provide a clearance for the block 112 on the front face of the intermediate driving element 80. The staple-driver 305 has laterally-extending tongues or fins 309 fitting in the grooves 283 formed on the inner faces of the legs 277 and 278 of the bender-bar 276, see Figs. 2 and 29. The actuating bar 306 for the staple-driver 305 extends upwardly beyond the intermediate driving element and has a slot 310 adjacent its upper end which embraces the laterally-extending lug 75 on the main driving element 58. The opposite ends of the staple-driver 305 are beveled at 311 for a purpose as later explained; this element being reversible in position when worn.

The lug 75 and slot 310 provide a driving connection between the main driving element 58 and the staple-driver 305 which latter is actuated throughout the full stroke of the driving element. The staple-driver 305 moves downwardly with the bender-bar 276 during the beginning of the forward stroke of the latter and after the bender-bar has completed the formation of a staple and come to rest the staple-driver continues its movement from the position shown in Fig. 30 to the position shown in Fig. 31 to drive the formed staple into the work X. During the downward movement of the staple-driver 305 its forward beveled face 311 engages the rearward beveled face 247 of the anvil-block and cams the latter forwardly to the position shown in Fig. 30 to adapt it to receive another partly-formed staple. As shown in Fig. 30, the staple-supporter 284 has been moved to a position below the staple then held merely by its frictional engagement with the grooves 283 in the legs 277 and 278 of the vertically acting bender-bar 276. Prior to the driving of the staple the rearward beveled face 312 on the actuating bar 306 engages the forwardly-inclined face 289 on the staple-supporter 284 and moves it rearwardly to an inoperative position as shown in Fig. 31. At this juncture the gripper-bar 248 has been moved downwardly to engage the partly-formed staple on the anvil 140 and upon the return stroke of the staple-driver 305 the anvil is moved rearwardly by the spring-pressed rod 240 to the position shown in Fig. 28 to commence a subsequent staple-driving operation as above explained.

Suitable clincher-jaws 315 are provided on the work-support 316 beneath the staple-driver for cooperation therewith in the usual manner to bend the lower ends of the staple legs into clinching engagement with the work X. Having now described a preferred form of construction of the invention in detail its mode of operation will next be explained.

Mode of operation

A continuous strip of wire or like material W is first fed from a source of supply downwardly across the front face of the plate 96 between the tension-rollers 101, one-way clutch 107 and roller 108 and through the grooves in the blocks 112 and 180, as shown in Fig. 1. The crank-shaft 55 is rotated to operate the machine, being usually driven from a suitable source of power to actuate the main driving element 58 with a reciprocatory motion through the link 56 connected to the crank-arm 57. Assuming that the main driving element 58 is approaching the end of its upward stroke, the laterally-projecting lug 74 on the forwardly-projecting block 73, see Fig. 2, will engage the cam-face 135 on the lever 134 in the manner indicated by dash lines in Fig. 24 to rock the lever on its pivot. The lower end of the lever 134 is thus caused to engage the upper projecting end of the arcuate slide 123 to move the latter on the arcuate face 122 of the block 112 to the position shown in Fig. 7 whereby to aline the lug 126 on the rearward face of the gripper 115 with the recess 124 on the slide. At this juncture the springs 120, acting on the rearward face of the gripper 115, move the latter to engage its serrated face 116 with the wire-strip W to grip it against the wall 114. The feeding mechanism is then in condition for a forward or downward stroke to advance a predetermined length of the wire-strip W.

With the main driving element 58 in its uppermost position as shown in Fig. 11 the driving plate 63 is connected thereto by the rocking crank 64. As previously explained, the pivot-stud 66 of the rocking crank 64 engages in the bearing aperture 65 in the main driving element 58 and the crank-pin 67 extends through the slot 70 of the driving plate 63, the crank being held against rotation by engagement of the roller 69 with the sides of the vertical slot 47 of the fixed plate 46. The intermediate element 80, in turn, is drivably connected with the driving plate 63 by the bolt 81 projecting into the rectangular slot 83 in the plate, see Fig. 11.

As the main driving element 58 begins its downward stroke the block 112 and gripper 115 carried on the front face of the intermediate element 80 are caused to move downwardly to feed the wire-strip W gripped to the block. At the beginning of this downward movement the inclined cam-face 266 on the front face of the driving plate 63 engages the rearwardly-extending lug 267 on the pivoted lever 252 and rocks the latter from the position shown in Fig. 7 to that shown in Fig. 23. This movement of the lever 252 causes the gripper-bar 248 carried by the anvil-lever 235 to be moved from the position shown in Fig. 28 to that shown in Fig. 29. The block 112 and the wire-strip W gripped thereto continue to move downwardly until the lower projecting end of the arcuate slide 123 engages the cam-face 128 on the abutment 129. Then, due to the continued movement of the block 112 the slide 123 is moved from the position shown in Fig. 23 to that shown in Fig. 24 and the gripper 115 is moved laterally to release the wire by the engagement of the cam-face 127 on the lug 126 with the cam-face 125 in the notch or recess 124 of the slide.

As the wire-strip W is released by the gripper 115 the intermediate element 80 continues its downward movement and its rearwardly-projecting arm 174 engages the shoulder 173 on the plunger 165 to cause the latter to depress the crank-arm 163 from the position shown in Fig. 35 to that shown in Fig. 36. The movement of the crank-arm 163 is transmitted through the shaft 160 and crank-arm 157 to move the wire-holding bar 141 from the position shown in Fig. 23 to that shown in Fig. 24 to clamp the wire against the side of the anvil 140. Due to the offset position of the V-shaped notch in the forked end of the holding bar 141, see Fig. 37, the end of the wire-strip W is bent forwardly at a slight angle to its direction of feed. The intermediate element 80 still continues its downward movement until the roller 69 on the rocking crank 64 engages the horizontal extension 48 of the slot 47 as shown in Fig. 18, whereafter the driving plate 63 is held from further downward movement.

Just before the driving plate 63 and intermediate element 80 come to rest in the relationship shown in Fig. 24, the laterally-projecting lug 74 on the main driving element 58 engages the upper end of the extension 210 of the actuating bar 201. Downward movement of the lug 74 causes the rocking key 214 to move to the right as viewed in Fig. 24 to shift it into the slot 219 in the plate 212. The extension-bar 210 and connected actuating bar 201 are then moved downwardly with the main driving element 58 with the cam-face 206 on the bar 201 engaging the cam-face 200 on the rear of the pivoted member 193. The continued downward movement of the actuating bar 201 then causes the member 193 to be moved from the position shown in Fig. 38 to that shown in Fig. 39. Due to the engagement of the lug 195 on the forward face of the member 193 with the slot 192 in the rearward face of the cutter-bar 179, the cutter-bar is slid longitudinally to cause its cutting edge 191 to sever the length of wire advanced by the feeding means. Immediately following the actuation of the cutter-bar 179 the cam-face 230 at the lower end of the bar 201 engages the cam-face 229 on the rearwardly-projecting lug 228 on the horizontally-movable bender-bar 225, see Figs. 24, 25 and 42. As the bar 201 continues its downward movement the bender-bar 225 is moved from the position shown in Fig. 24 to that shown in Fig. 25 and the inward end of the bar bends the vertical extension of the severed length w of the wire to a horizontal position across the seat 246 of the anvil 140.

Near the end of the downward stroke of the main driving element 58 the forwardly-projecting pin 270 on the actuating bar 306 engages the lug 271 on the pivoted lever 252 and moves the latter from the position shown in Fig. 25. This movement of the pivoted lever 252 causes the gripper-bar 248 carried on the front face of the anvil-lever 235 to be moved from the position shown in Fig. 30 to that shown in Fig. 31 with its lower end gripping and holding the horizontal portion of the length of wire w against the horizontal seat 246 on the anvil 140.

Simultaneously with the action of the gripper-bar 248 near the lower end of the forward stroke of the main driving element 58 the cam-face 77 on the latter engages the upper cam-face 85 on the lug 84 extending rearwardly from the bolt 81, see Fig. 17. Relative movement between the main driving element 58 and the lug 84 causes the bolt 81 to be withdrawn from its engagement with the driving plate 63 and moved to the position shown in Fig. 17 where the bottom of the lug 84 overlies the shoulder 79 on the main driving element. When work X is positioned below the head the end of the bender-bar 276 will engage therewith to effect a relative movement between the main driving element 58 and the intermediate driving element 80. When no work is below the head the rearwardly-extending arm 174 on the intermediate element 80 engages the lug 36 on the wall 4 of the bonnet-frame which acts as a stop to limit the movement of the bender-bar whereby the movement of the main driving element relatively thereof will cause actuation of the bolt 81.

The main driving element 58 then commences its return stroke and carries with it the bar 210 locked to the plate 212 by the rocking key 214 and also the intermediate driving element 80 connected through the lug 84 and shoulder 79. During this return stroke the cam-face 207 on the bar 201 engages the inner face 209 of the lug 199 on the member 193 and moves it, together with the cutter-bar 179, to its inoperative position, see Fig. 7. During the return stroke of the bender-bar 276 the inclined cam-face 232 at the lower end of the recess 231 in its forward face engages the rearwardly-extending lug 228 on the horizontally movable bender-bar 225 and moves it to its inoperative position as shown in Fig. 23. The bar-extension 210 continues its upward movement until its upper end engages the shoulder 20 on the plate 17. Continued upward movement of the plate 212 carried by the driving element 58 causes the cam-face 220 in its slot 219 to slide on the cam-face 216 on the rocking key 214 to thereby move the rocking key into the registering recess 217 in the plate 17 as shown in Fig. 24. The bar-extension 210 and connected actuating bar 201 are then held in this position until the main driving element completes its return stroke and again moves downwardly to carry the lug 74 into engagement with the upper end of the bar.

Figure 19:
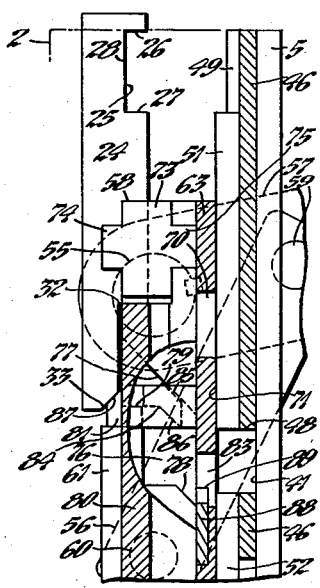
Fig. 19 is a view similar to Fig. 17 showing the relationship of the elements when the main driving element has been moved substantially halfway through its return stroke.
Figure 20:
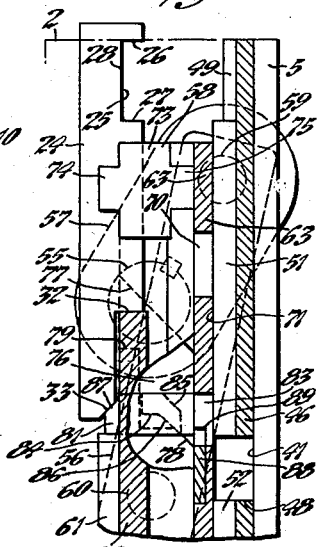
Fig. 20 is a view similar to Figs. 17 and 19 showing the relationship of the elements just prior to the end of the return stroke of the main driving element.

As the driving element 80 moves upwardly the arm 174 extending rearwardly therefrom releases the plunger 165 which is raised by the spring 170 to move the crank-arm 163 to the position shown in Fig. 35 by the engagement of the pin 166 therewith. This movement of the crank-arm 163 acts through the shaft 160 and crank 157 to return the holding bar 141 to its inoperative position. As the staple-driver 305 is raised to a position above the anvil-block 140 the lever 235 is moved rearwardly by the spring-pressed rod 240 to the position shown in Figs. 28 and 29 to position the anvil-block directly below the vertically-movable bender-bar 276. The intermediate element 80 continues its upward movement with the main driving element 58 until the cam-face 87 on the projecting end of the bolt 81 engages the cam-face 33 on the fixed plate 24, as shown in Fig. 19. Relative movement between the bolt 81 and fixed plate 24 then causes the bolt to be shifted to release the lug 84 from the shoulder 79, after which the intermediate driving element 80 is held against further upward movement and the main driving element continues its upward stroke.

The driving plate 63 is also returned with the main driving element 58 by the engagement of the roller 68 on the rocking crank 64 with the upper face of the slot 70 in the plate. In this manner all of the elements are returned to the position shown in Figs. 4 to 16, 25, 35 and 38 and the gripper 115 is again actuated by the lever 134 as before explained to engage and hold the wire-strip W against the wall 114. The machine is then ready for the driving element 58 to commence another downward stroke to feed, hold, sever and bend a length of wire across the anvil in the manner as previously described.

Simultaneously with this feeding operation and prior to the forming of a second staple the vertically-movable bender-bar 276 moves from the position shown in Fig. 28 to that shown in Fig. 29 to thereby bend the horizontally-extending end of the length of wire $w$ vertically against the side of the anvil-block 140 and parallel to the first formed leg to complete the formation of a staple. When the staple $s$ is thus formed its legs lie in the grooves 283 in the opposite legs 277 and 278 of the bender-bar 276. As the bender-bar 276 and staple-driver 305 move downwardly as a unit the forward beveled face 311 of the staple-driver engages the inclined face 247 on the anvil-block 140 and cams the latter to its forward position shown in Fig. 30. Simultaneously with the movement of the anvil-block 140 to its forward position the head 288 of the staple-supporter moves forwardly to a position beneath the head of the staple $s$ and between the legs 277 and 278 of the bender-bar 276 to prevent the staple from dropping from the bender-bar. The anvil-block 140 is then in position to receive the second length of wire advanced by the feeding means.

The intermediate element 80 and attached bender-bar 276 complete their downward stroke as the rocking crank 64 engages the horizontal leg 48 of the slot 47 in the stationary plate 46 as previously explained. The continued movement of the driving element 58 and attached staple-driver 305 drives the staple through the grooves 283 in the legs of the bender-bar 276 and into the work X as shown in Fig. 25. During the driving of the staple the rearward beveled face 312 on the staple-driver actuating bar 306 engages the forwardly-directed beveled face 289 on the staple-supporter head 288 and moves it rearwardly as shown in Fig. 31. The clincher-jaws 315 are actuated by suitable means, not herein shown, to operate in timed relation with the driving of the staple to bend and clinch its legs against the under face of the work to complete the stapling operation.

During the driving of the formed staple $s$ another length $w$ of the wire has been fed and bent laterally over the anvil 140 when the latter is in its forward position as shown in Figs. 30 and 31 and the formation of the staple is completed and the staple driven during the next succeeding stroke. In this manner a complete stapling operation is completed during two cycles of operation of the machine, a staple being driven during each cycle of operation of the machine.

Having now described the invention and its mode of operation it will be apparent that a novel machine has been provided for forming staples from a continuous strip of wire or like material fed to the machine. The machine operates to advance the wire-strip, sever predetermined lengths therefrom and bend the wire first laterally and then vertically over an anvil to from the staples.

Although the present specification describes the wire as being fed vertically and the bender-bars as horizontally and vertically acting, it will be understood that this description refers to the action of the mechanisms when the stapling head is in an upright position as illustrated in the drawings. On the other hand, the head may be turned to any position to perform the desired stapling operation and the terms "vertical", "horizontal" and "lateral" are not to be construed as limiting the use of the head to an upright position as shown.

While the invention is herein illustrated and described as embodied in a preferred form of construction it is to be understood that variations may be made in the structure and arrangement of its parts without departing from the spirit or scope of the invention. Therefore, without limiting myself in this respect, I claim:

1. In a stapling or wire-stitching machine, a frame, a head, means for mounting the head on the frame, means at the front of the head for feeding a length of wire to be formed into a staple, means at one side of the head for bending the wire adjacent one end thereof, parallel to the front of the head, means acting after the first-mentioned bending means for bending the length of wire adjacent its opposite end to form a staple in a plane parallel to the front of the head, and means operable in the same direction as the feeding means for driving the formed staple into the work.

2. In a wire-stapling or stitching machine, means for feeding a length of wire to be formed into a staple, a bender-element for bending the wire adjacent one end thereof, a second bender-element independent of and operating at right-angles to the first-mentioned bender-element for bending the opposite end of the wire to form a staple, and means for driving the formed staple into the work.

3. In a stapling or wire-stitching machine, means for feeding a length of wire to be formed into a staple, means for bending the wire adjacent one end thereof, means for bending the wire adjacent its opposite end to form a staple, means operable in the same direction as the feeding means for driving the formed staple while another length of wire is being fed, and means for successively actuating the first- and second-mentioned bending means and the staple-driving means.

4. In a stapling or wire-stitching machine, means for feeding a predetermined length of wire to be formed into a staple, means for bending the wire adjacent one end thereof to form an L-shaped strip, means actuated simultaneously with the feeding means for bending the opposite end of the wire to form a U-shaped staple while another length of wire is being fed, and means for driving the formed staple into the work.

5. In a stapling or wire-stitching machine, means for vertically feeding a predetermined length of wire to be formed into a staple, means for bending the wire horizontally adjacent one end thereof, means connected to the wire-feeding means for bending the wire vertically adjacent its opposite end to form a staple during the feeding of another length of wire, and means for driving the formed staple.

6. In a stapling or wire-stitching machine, means for feeding a predetermined length of wire to be formed into a staple, means for holding the forward end of the length of the wire, means for moving said holding means into engagement with the wire, means for bending the wire at right-angles adjacent the end that is held, and means for bending the opposite end of the wire in parallel relation to the held end to form a staple.

7. In a stapling or wire-stitching machine, an anvil, means for feeding a length of wire to position its forward end adjacent one side of the anvil, means for bending the rearward portion of the length of wire over two sides of the anvil adjacent and opposite the side against which the wire is first fed whereby to form a staple, and means for driving the formed staple simultaneously with the feeding of another length of wire.

8. In a stapling or wire-stitching mechanism, an anvil, means for feeding a length of wire to position its forward end adjacent one side of the anvil, means for bending the rearward portion of the length of wire across a side of the anvil at right-angles to the first-mentioned side, and means independent of the first-mentioned bending means for bending the end of the rearward portion of the wire over a third side of the anvil opposite and parallel to the first-mentioned side to form a staple.

9. In a stapling or wire-stitching machine, a rectangular anvil, means for feeding a length of wire to a position adjacent one side of the anvil, a reciprocating member for holding the wire against the side of the anvil, means for bending the wire across a side of the anvil at right-angles to the side against which the wire is held, and means independent of the first-mentioned bending means and acting at right-angles thereto for bending the free end of the wire over the side of the anvil parallel to the first-mentioned side to form a staple.

10. In a stapling or wire-stitching machine, an anvil, means for feeding predetermined lengths of a continuous wire-strip to a position adjacent one side of the anvil, means for severing a length of wire from the strip fed, a reciprocating member for holding the wire against the side of the anvil, and means for bending the severed length of wire over the sides of the anvil adjacent and opposite the side to which the wire is fed to form a staple.

11. In a stapling or wire-stitching machine, an anvil, means for feeding a predetermined length of a continuous wire-strip to a position adjacent one side of the anvil, a reciprocating member for holding the wire against the side of the anvil, means for severing a predetermined length of wire from the strip, and means for bending the severed length of wire across the adjacent and opposite sides of the anvil to form a staple.

12. In a stapling or wire-stitching machine, an anvil, means for feeding a predetermined length of continuous wire-strip to a position adjacent one side of the anvil, means for holding the wire against the side of the anvil, means for severing the length of wire, means for bending the severed length of wire across the adjacent side of the anvil, and means independent of and acting at right-angles to the first-mentioned bending means for bending the free end of the wire across the opposite side of the anvil to form a staple.

13. In a stapling or wire-stitching machine, an anvil, means for feeding a continuous wire-strip parallel to one side of the anvil, a movable bar for holding the forward end of the wire against the side of the anvil, a cutter-bar for severing a length from the strip advanced by the feeding means, a bender-bar for bending the rearward portion of the severed length of wire across the side of the anvil adjacent the first-mentioned side, and a second bender-bar for bending the end of the rearward portion of the wire against the side of the anvil opposite the first-mentioned side to form a staple.

14. In a stapling or wire-stitching machine, an anvil, means for vertically feeding a continuous wire-strip against one side of the anvil, a laterally-movable bar for holding the forward end of the wire against one side of the anvil, a laterally-movable cutter-bar for severing the length of wire advanced by the feeding means, a laterally-movable bender-bar for bending the rearward portion of the severed length of wire across the side of the anvil adjacent the first-mentioned side, and a vertically-movable bender-bar for bending the end of the rearward portion of the wire against the side of the anvil opposite the first-mentioned side to form a staple.

15. In a stapling or wire-stitching machine, an anvil, means for feeding a predetermined length of a continuous wire to a position adjacent one side of the anvil, means for severing the length of wire advanced by the feeding means, a reciprocating bender-bar for bending the wire over the side of the anvil adjacent the first-mentioned side, a second bender-bar acting at right-angles to the first-mentioned bender-bar for bending the opposite end of the wire against the opposite side of the anvil to form a staple, means for driving the formed staple, and means for operating the severing, bending and staple-driving means in succession.

16. In a stapling or wire-stitching machine, an anvil, means for feeding a predetermined length of continuous wire-strip to a position adjacent one side of the anvil, a laterally-movable bar for holding the wire against the side of the anvil, means for severing the length of wire advanced by the feeding means, means for bending the severed length of wire laterally across an adjacent side of the anvil, means independent of the first-mentioned bending means for bending the extension of the wire against the opposite side of the anvil to form a staple, means for driving the formed staple, and means for operating the holding, cutting, bending and staple-driving means in succession.

17. In a stapling or wire-stitching machine, an anvil, means for feeding a length of wire adjacent one side of the anvil, means for bending the wire across an adjacent side of the anvil, means for gripping the wire after it has been bent, and means independent of the gripping means for bending the opposite end of the wire over the opposite side of the anvil to form a staple.

18. In a stapling or wire-stitching machine, means for vertically feeding a length of wire to be formed into a staple, means for bending the wire horizontally adjacent one end, means for gripping the wire, and means independent of the gripping means for bending the opposite end of the wire vertically to form a staple.

19. In a stapling or wire-stitching machine, an anvil mounted for movement from one to the other of two positions, means for feeding a length of wire adjacent one side of the anvil in one of its positions, means for holding the end of the wire against the side of the anvil, means for bending the wire over an adjacent side of the anvil, means for gripping the wire to the adjacent side of the anvil, means for moving the anvil to its second position with the wire gripped thereto, and means cooperating with the anvil in its second position for bending the opposite end of the wire against the opposite side of the anvil to form a staple.

20. In a stapling or wire-stitching machine, an anvil, means for vertically feeding a length of wire to a position adjacent one side of the anvil, a laterally-movable bender-bar for bending the wire across the top of the anvil, means for gripping the wire to the top of the anvil, a vertically-movable bender-bar, means for moving the anvil to a position below the bender-bar, and means for actuating the bender-bar to bend the opposite end of the wire to form a staple.

21. In a stapling or wire-stitching machine, an anvil, a reciprocating driving mechanism, means actuated by the driving mechanism during its forward stroke for feeding a length of wire to a position adjacent one side of the anvil, a bender-bar actuated by the driving mechanism adjacent the end of its forward stroke for bending the wire across a side of the anvil adjacent the first-mentioned side, a second bender-bar acting at right-angles to the first-mentioned bender-bar, and means for moving the anvil into cooperative relationship with the second-mentioned bender-bar during the return stroke of the driving mechanism, said second-mentioned bender-bar cooperating with the anvil to bend the opposite end of the wire to form a staple during the next succeeding forward stroke of the driving mechanism.

22. In a stapling or wire-stitching machine, a reciprocating driving means, an anvil movable from a forward to a rearward position, means actuated by the driving means for feeding predetermined lengths of wire to a position adjacent one side of the anvil, means for holding the length of wire against the side of the anvil at a slight angle to the direction in which it is fed, means actuated by the driving means at the end of the feeding stroke for bending the wire across the adjacent side of the anvil while the anvil is forwardly positioned, means actuated by the driving means for bending the opposite end of the wire against the opposite side of the anvil and parallel to the first-mentioned end when the anvil is rearwardly positioned, and means for moving the anvil to its rearward position during the return stroke of the driving means.

23. In a stapling or wire-stitching machine, a driving element, a reciprocating element for feeding predetermined lengths of wire to be formed into staples, gripping means on the feeding element, means for actuating the gripping means to release the wire during the reciprocation of the feeding element, and means for connecting the elements during a portion of the stroke of the driving element and releasing the feeding element during the remainder of the stroke.

24. In a stapling or wire-stitching machine, a driving element, an element for feeding predetermined lengths of wire to be formed into staples, means for connecting the elements during a portion of the stroke of the driving element and releasing the feeding element during the remainder of the stroke, and a laterally-movable bender-bar actuated by the driving element after the feeding element has been released by the driving element.

25. In a stapling or wire-stitching machine, a driving element, an element for feeding a strip of wire to be formed into staples during the forward stroke of the driving element, means for connecting the elements during part of the forward stroke of the driving element and releasing the feeding element during the remainder of the stroke, a cutter-bar for severing lengths of wire from the strip, and a laterally-movable bender-bar, said cutter-bar and laterally-movable bender-bar being successively actuated by the driving element after the feeding element has been released by the driving element.

26. In a stapling or wire-stitching machine, an anvil, a driving element, an element for feeding predetermined lengths of wire adjacent the anvil during the forward stroke of the driving element, means for connecting the elements during part of the forward stroke of the driving element and releasing the feeding element during the remainder of the stroke, laterally-movable means for holding the wire against the side of the anvil, and a laterally-movable bender-bar for bending the wire over the top of the anvil, said holding means and laterally-movable bender-bar being successively actuated by the feeding element and driving element during their forward strokes.

27. In a stapling or wire-stitching machine, an anvil, a driving element, an element for feeding lengths of wire to a position adjacent the side of the anvil during the forward stroke of the driving element, means for connecting the elements during part of the stroke of the driving element and releasing the feeding element during the remainder of the stroke, a laterally-movable bar for holding the wire against the side of the anvil, a cutter-bar for severing the wire, and a laterally-movable bender-bar for cooperating with the anvil to form a right-angular bend in the wire adjacent one end thereof, said holding bar, cutting bar and bender-bar being successively actuated by the driving element after the feeding element has completed a feeding operation.

28. In a stapling or wire-stitching machine, a driving element, an intermediate element, means actuated by the intermediate element for feeding lengths of wire to be formed into staples, means actuated by the driving element for bending the wire to partially form a staple, and means actuated by the intermediate element to bend the wire to complete the formation of the staple.

29. In a stapling or wire-stitching machine, means for feeding a predetermined length of wire to be formed into a staple, means for bending the wire to partially form a staple, a second means for bending the wire to complete the formation of the staple, an intermediate element for simultaneously actuating the feeding means and second-mentioned bending means, and a driving element for actuating the first-mentioned bending means after one staple has been formed and another length of wire has been advanced to partially form another staple.

30. In a stapling or wire-stitching machine, a driving element, an intermediate element, means for connecting said elements during a portion of the stroke of the driving element and releasing the intermediate element during the remainder of the stroke, means carried by the intermediate element for gripping and feeding predetermined lengths of wire, a bender-bar actuated by the driving element after the intermediate element has completed a feeding stroke to bend the wire and partially form a staple, and a bender-bar carried by the intermediate element and acting at right-angles to the first-mentioned bender-bar for completing the formation of the staple during its next succeeding stroke.

31. In a stapling or wire-stitching machine, a driving element, an intermediate element, means for connecting the elements during a portion of the stroke of the driving element and releasing the intermediate element during the remainder of the stroke, means for feeding lengths of wire, means for bending the wire adjacent one end thereof, a second means acting at right-angles to the first-mentioned bending means for bending the wire adjacent its opposite end, said feeding means and second-mentioned bending means being simultaneously actuated by the intermediate element, and said first-mentioned bending means being actuated by the driving element after the intermediate element has completed its forward stroke.

32. In a stapling or wire-stitching machine, means for feeding a predetermined length of continuous wire-strip to be formed into a staple, cutting means for severing the length of wire advanced by the feeding means, means for bending the rearward portion of the severed length of wire at right-angles to the direction in which it is advanced, and a slide having cam-faces for successively actuating the cutting means and bending means.

33. In a stapling or wire-stitching machine, a laterally-movable cutter-bar, an actuating member pivotally mounted at one end and connected to the cutter-bar at its opposite end, a main driving element having forward and return strokes, a reciprocating slide, said slide being actuated by the driving element adjacent the end of its forward stroke, and interengaging means on the slide and actuating member for rocking the latter about its pivot to operate the cutter-bar.

34. In a stapling or wire-stitching machine, a driving element, an intermediate element driven by the driving element through part of its stroke, feeding means actuated by the intermediate element, a cutter-bar, an actuating member pivotally mounted at one end and connected with the cutter-bar at its opposite end, a reciprocating slide, said slide being actuated by the driving element after the intermediate element has completed a feeding operation, and interengaging cam-faces on the slide and actuating member for rocking the latter about its pivot to operate the cutter-bar.

35. In a stapling or wire-stitching machine, means for feeding a length of wire, a cutter-bar, a bender-bar adjacent the cutter-bar, and a reciprocating slide for actuating the cutter-bar and bender-bar in succession at right-angles to the direction of movement of the slide.

36. In a stapling or wire-stitching machine, a main driving element having forward and return strokes, an intermediate element actuated by the driving element through a portion of its stroke, means carried by the intermediate element for feeding predetermined lengths of a continuous wire-strip, a cutter-bar, a bender-bar, said cutter-bar and bender-bar acting at right-angles to the direction of movement of the feeding means, and means actuated by the driving element after the intermediate element has completed a feeding stroke for actuating the cutter-bar and bender-bar in succession.

37. In a stapling or wire-stitching machine, a driving element, a cutter-bar, a bender-bar, said cutter-bar and bender-bar arranged in parallel relationship, and a reciprocating slide actuated by the driving element and having cams for actuating the cutter-bar and bender-bar in succession.

38. In a stapling or wire-stitching machine, a reciprocating driving element, a slide actuated by the driving element during a portion of the forward and return strokes of the driving element, means for automatically latching the element and slide during the forward stroke of the slide and releasing the element at the end of the return stroke of the slide, and a cutter-bar actuated by the slide.

39. In a stapling or wire-stitching machine, a movable cutter-bar, a main driving element having forward and return strokes, a reciprocating slide for actuating the cutter-bar, said slide being actuated by the driving element adjacent the end of its forward stroke, and a movable key for connecting the slide with the driving element to effect a return movement of the slide.

40. In a stapling or wire-stitching machine, a frame, a reciprocating driving element in said frame, a slide actuated by the driving element during a portion of its forward and return strokes, a movable key carried by the slide and shifted into engagement with the driving element during the forward stroke of the slide and into engagement with the frame at the end of its return movement, a cutter-bar, and a bender-bar, said cutter-bar and bender-bar being actuated by the slide.

41. In a stapling or wire-stitching machine, an anvil, means for feeding predetermined lengths of wire adjacent the side of the anvil, means for holding the end of the wire against the side of the anvil, and means engaged by the feeding means to actuate the holding means after the feeding means has advanced a length of wire.

42. In a stapling or wire-stitching machine, an anvil, means for feeding predetermined lengths of wire adjacent the side of the anvil, a holding bar laterally movable with respect to the wire for holding its end against the side of the anvil, means for operating the bar, and means on said feeding means for actuating said operating means for the holding bar after the feeding means has advanced a length of the wire.

43. In a stapling or wire-stitching machine, a gripper having forward and return strokes for feeding a length of wire, resilient means for moving the gripper to engage a continuous wire-strip during its forward stroke, a slide having a cam for actuating the gripper to move it to a releasing position against the action of the resilient means, and an abutment engaged by the slide adjacent the end of the forward stroke of the gripper to cause it to move the gripper to a releasing position.

44. In a stapling or wire-stitching machine, a reciprocating element, a block having a groove for the passage of a continuous strip of wire, a gripper carried by the block, springs for normally urging the gripper to engage and hold the wire against the side of the groove, an arcuate slide cooperating with the gripper to permit the gripper to engage the wire and actuating the gripper to release the wire, and means for actuating the slide at each end of the stroke of the reciprocating element.

45. In a stapling or wire-stitching machine, a main driving element, an intermediate driving element, an anvil, means for feeding predetermined lengths of wire adjacent one side of the anvil, means for bending the length of wire over the side of the anvil adjacent the side against which the wire is fed, means acting at right-angles to the first-mentioned bending means for bending the wire to form a staple, and a staple-driver, said intermediate element simultaneously actuating the feeding means and second-mentioned bending means and said main driving element actuating the first-mentioned bending means and staple-driver.

46. In a stapling or wire-stitching machine, a main driving element, an intermediate driving element, an anvil, means for feeding predetermined lengths of wire adjacent the side of the anvil, a movable bender-bar for bending the wire over the side of the anvil adjacent the side to which it is fed, a second bender-bar for bending the wire to complete the formation of a staple, and a staple-driver, said intermediate element simultaneously actuating the feeding means and second-mentioned bender-bar, and said main driving element actuating the first-mentioned bender-bar and staple-driver to partially form one staple and drive the previously formed staple.

47. In a stapling or wire-stitching machine, a main driving element, an intermediate driving element, an anvil, means for feeding predetermined lengths of wire adjacent one side of the anvil, a cutter-bar, a laterally-movable bender-bar, a vertically-movable bender-bar, and a staple-driver, said intermediate element actuating the feeding means and vertically-movable bender-bar, and said main driving element actuating the cutter-bar, bender-bar and staple-driver after the intermediate element has completed its forward stroke whereby a length of wire its partially formed into a staple while a previously fed wire is completely formed into a staple and driven.

48. The method of wire-stitching which comprises feeding a predetermined length of wire, holding the forward end of the length of wire, bending the rearward portion of the wire at right-angles to the forward held end to form an L-shaped strip, transferring the L-shaped strip to a position substantially parallel to but spaced from the plane in which it was fed, bending the end of the rearward portion of the wire parallel to the forward held end to form a U-shaped staple, driving the formed staple, and simultaneously feeding and bending the rearward portion of another length of wire while the first wire is being bent to form a staple and the formed staple driven.

49. The method of wire-stitching which comprises intermittently feeding predetermined lengths of a continuous wire strip vertically, severing the lengths of wire, bending a portion of each length of wire horizontally to form an L-shaped strip and simultaneously bending the horizontal portion of a previously formed L-shaped strip vertically to form a U-shaped staple, and driving the formed staple into the work.

HOWARD G. ALLEN.